US012235452B2

(12) United States Patent
Messer et al.

(10) Patent No.: US 12,235,452 B2
(45) Date of Patent: Feb. 25, 2025

(54) ANGULARLY SELECTIVE ATTENUATION OF LIGHT TRANSMISSION ARTIFACTS IN WEARABLE DISPLAYS

(71) Applicant: Magic Leap, Inc., Plantation, FL (US)

(72) Inventors: Kevin Messer, Mountain View, CA (US); Joshua Naaman Haddock, Sarasota, FL (US); Hui-Chuan Cheng, Cooper City, FL (US); Vaibhav Mathur, Playa Vista, CA (US); Clinton Carlisle, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/303,459

(22) Filed: Apr. 19, 2023

(65) Prior Publication Data

US 2023/0258940 A1 Aug. 17, 2023

Related U.S. Application Data

(63) Continuation of application No. 17/194,086, filed on Mar. 5, 2021, now Pat. No. 11,662,586.
(Continued)

(51) Int. Cl.
*G02B 27/01* (2006.01)
*G02B 25/00* (2006.01)
(Continued)

(52) U.S. Cl.
CPC ....... *G02B 27/0172* (2013.01); *G02B 25/001* (2013.01); *G02B 27/281* (2013.01);
(Continued)

(58) Field of Classification Search
CPC .............. G02B 27/0172; G02B 25/001; G02B 27/281; G02B 2027/011;
(Continued)

(56) References Cited

U.S. PATENT DOCUMENTS 5,515,186 A 5/1996 Fergason et al.
5,594,570 A 1/1997 Hirata et al.
(Continued)

FOREIGN PATENT DOCUMENTS

JP S64057203 A 3/1989
JP H04238724 A 8/1992
(Continued)

OTHER PUBLICATIONS

Azuma, "A Survey of Augmented Reality," Presence: Teleoperators and Virtual Environments, Aug. 1997, 6(4):355-385.
(Continued)

*Primary Examiner* — Nathanael R Briggs
(74) *Attorney, Agent, or Firm* — Fish & Richardson P.C.

(57) ABSTRACT

A wearable display system includes an eyepiece stack having a world side and a user side opposite the world side. During use, a user positioned on the user side views displayed images delivered by the wearable display system via the eyepiece stack which augment the user's field of view of the user's environment. The system also includes an optical attenuator arranged on the world side of the of the eyepiece stack, the optical attenuator having a layer of a birefringent material having a plurality of domains each having a principal optic axis oriented in a corresponding direction different from the direction of other domains. Each domain of the optical attenuator reduces transmission of visible light incident on the optical attenuator for a corresponding different range of angles of incidence.

14 Claims, 19 Drawing Sheets

Related U.S. Application Data

(60) Provisional application No. 62/986,478, filed on Mar. 6, 2020.

(51) Int. Cl.
  *G02B 27/28* (2006.01)
  *G02F 1/01* (2006.01)
  *G02F 1/1335* (2006.01)
  *G02F 1/13363* (2006.01)
  *G02F 1/1337* (2006.01)
  *G02F 1/1343* (2006.01)
  *G02F 1/139* (2006.01)

(52) U.S. Cl.
  CPC ...... *G02F 1/0136* (2013.01); *G02F 1/133531* (2021.01); *G02F 1/133631* (2021.01); *G02F 1/133638* (2021.01); *G02F 1/133749* (2021.01); *G02F 1/133761* (2021.01); *G02F 1/134309* (2013.01); *G02F 1/1393* (2013.01); *G02B 2027/011* (2013.01); *G02B 2027/0178* (2013.01); *G02F 2413/01* (2013.01); *G02F 2413/10* (2013.01)

(58) Field of Classification Search
  CPC ....... G02B 2027/0178; G02F 1/133749; G02F 1/133531; G02F 1/133631; G02F 1/133638; G02F 1/133761; G02F 1/0136; G02F 1/134309; G02F 1/1393; G02F 2413/01; G02F 2413/10
  See application file for complete search history.

(56) References Cited

U.S. PATENT DOCUMENTS

| | | | |
|---|---|---|---|
| 5,864,432 | A | 1/1999 | Deter |
| 7,758,185 | B2 | 7/2010 | Lewis |
| 8,353,594 | B2 | 1/2013 | Lewis |
| 8,696,113 | B2 | 4/2014 | Lewis |
| 8,733,927 | B1 | 5/2014 | Lewis |
| 8,733,928 | B1 | 5/2014 | Lewis |
| 9,010,929 | B2 | 4/2015 | Lewis |
| 9,235,064 | B2 | 1/2016 | Lewis |
| 9,239,473 | B2 | 1/2016 | Lewis |
| 9,244,293 | B2 | 1/2016 | Lewis |
| 9,658,473 | B2 | 5/2017 | Lewis |
| 10,151,937 | B2 | 12/2018 | Lewis |
| 10,185,147 | B2 | 1/2019 | Lewis |
| 11,009,737 | B1* | 5/2021 | Matsuda ........... G02F 1/133504 |
| 11,067,809 | B1 | 7/2021 | Sears et al. |
| 11,181,741 | B1 | 11/2021 | Yaroshchuk et al. |
| 2005/0180017 | A1 | 8/2005 | Hara et al. |
| 2006/0285207 | A1 | 12/2006 | Hay |
| 2008/0151160 | A1 | 6/2008 | Wang et al. |
| 2009/0051707 | A1 | 2/2009 | Hirata et al. |
| 2011/0069267 | A1 | 3/2011 | Moon et al. |
| 2012/0169950 | A1 | 7/2012 | Tatzel et al. |
| 2013/0127980 | A1 | 5/2013 | Haddick et al. |
| 2013/0176704 | A1 | 7/2013 | Lanman et al. |
| 2014/0233105 | A1 | 8/2014 | Schmeder et al. |
| 2015/0084999 | A1 | 3/2015 | Sprague |
| 2015/0205126 | A1 | 7/2015 | Schowengerdt |
| 2016/0154244 | A1 | 6/2016 | Border |
| 2016/0266389 | A1 | 9/2016 | Ouderkirk |
| 2016/0291230 | A1* | 10/2016 | Weichelt ............... G02F 1/1313 |
| 2017/0336641 | A1 | 11/2017 | Von Und Zu Liechtenstein |
| 2018/0059414 | A1 | 3/2018 | Campbell et al. |
| 2018/0113334 | A1 | 4/2018 | Fang et al. |
| 2018/0136471 | A1 | 5/2018 | Miller et al. |
| 2018/0180890 | A1 | 6/2018 | Baerenrodt et al. |
| 2018/0188536 | A1 | 7/2018 | Bell et al. |
| 2018/0239146 | A1 | 8/2018 | Bierhuizen et al. |
| 2018/0239147 | A1 | 8/2018 | Schowengerdt et al. |
| 2018/0275415 | A1 | 9/2018 | Schowengerdt et al. |
| 2019/0086672 | A1 | 3/2019 | Kim et al. |
| 2019/0107719 | A1 | 4/2019 | Edwin et al. |
| 2019/0187474 | A1 | 6/2019 | Bhargava et al. |
| 2019/0216307 | A1 | 7/2019 | Coon et al. |
| 2019/0227321 | A1 | 7/2019 | Lee et al. |
| 2019/0353943 | A1 | 11/2019 | Smith et al. |
| 2020/0116995 | A1 | 4/2020 | Chi et al. |
| 2020/0150425 | A1 | 5/2020 | Hatzilias et al. |
| 2020/0341268 | A1 | 10/2020 | Amirsolaimani et al. |
| 2021/0041711 | A1 | 2/2021 | Sharp et al. |
| 2021/0080763 | A1 | 3/2021 | Sulai et al. |
| 2021/0116712 | A1 | 4/2021 | Manly et al. |
| 2021/0364799 | A1 | 11/2021 | Guo et al. |
| 2021/0405402 | A1 | 12/2021 | Cheng et al. |

FOREIGN PATENT DOCUMENTS

| | | |
|---|---|---|
| JP | 2004004764 A | 1/2004 |
| JP | 2009104008 A | 5/2009 |
| JP | 2009198814 A | 9/2009 |
| JP | 2012163658 A | 8/2012 |
| JP | 2017120311 A | 7/2017 |
| JP | 2019511004 A | 4/2019 |
| JP | 2019511750 A | 4/2019 |
| JP | 2019523895 A | 8/2019 |
| WO | WO 2005/124431 | 12/2005 |
| WO | 2012026341 A1 | 3/2012 |
| WO | 2017176861 A1 | 10/2017 |
| WO | 2018152233 A1 | 8/2018 |
| WO | 2018224802 A1 | 12/2018 |
| WO | 2019220774 A1 | 11/2019 |
| WO | 2019241575 A1 | 12/2019 |
| WO | WO 2020/069026 | 4/2020 |
| WO | 2021256499 A1 | 12/2021 |

OTHER PUBLICATIONS

Azuma, "Predictive tracking for augmented reality," Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
Hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL<http://www.hitl.washington.edu/artoolkit/documentation/hardware.htm>, 3 pages.
International Search Report and Written Opinion in International Appln. No. PCT/US2020/055817, dated Feb. 9, 2021, 10 pages.
International Search Report and Written Opinion in International Appln. No. PCT/US2021/021224, dated Jun. 2, 2021, 9 pages.
International Search Report and Written Opinion in International Appln. No. PCT/US2021/039211, dated Sep. 30, 2021, 9 pages.
Jacob, "Eye Tracking in Advanced Interface Design," Virtual environments and advanced interface design, 1995, 258:288, 50 pages.
PCT Invitation to Pay Additional Fees in International Appln. No. PCT/US2020/055817, dated Dec. 9, 2020, 2 pages.
Rao et al., "Viewing angle controllable displays with a blue-phase liquid crystal cell," Optics Express, Feb. 2010, 18(3):3143-3148.
Tanriverdi et al., "Interacting with Eye Movements in Virtual Environments," Proc. of the SIGCHI Conference on Human Factors in Computing Systems, 2000, pp. 265-272.
Yan et al., "Extended Kerr effect of polymer-stabilized blue-phase liquid crystals," Appl. Phys. Lett., 2010, 96(7):071105, 6 pages.
Extended European Search Report in European Appln. No. 20877154.3, dated Oct. 10, 2023, 12 pages.
Extended European Search Report in European Appln. No. 21765145.4, dated Feb. 20, 2024, 9 pages.
Office Action in Japanese Appln. No. 2022-552801, dated Feb. 26, 2024, 6 pages (with English translation).
Office Action in Israeli Appln. No. 299472, dated May 30, 2024, 7 pages.

(56) References Cited

OTHER PUBLICATIONS

Office Action in Japanese Appln. No. 2022-522894, mailed on Oct. 9, 2024, 9 pages (with English translation).
Office Action in Japanese Appln. No. 2022-579996, dated Aug. 2, 2024, 12 pages (with English translation).

* cited by examiner

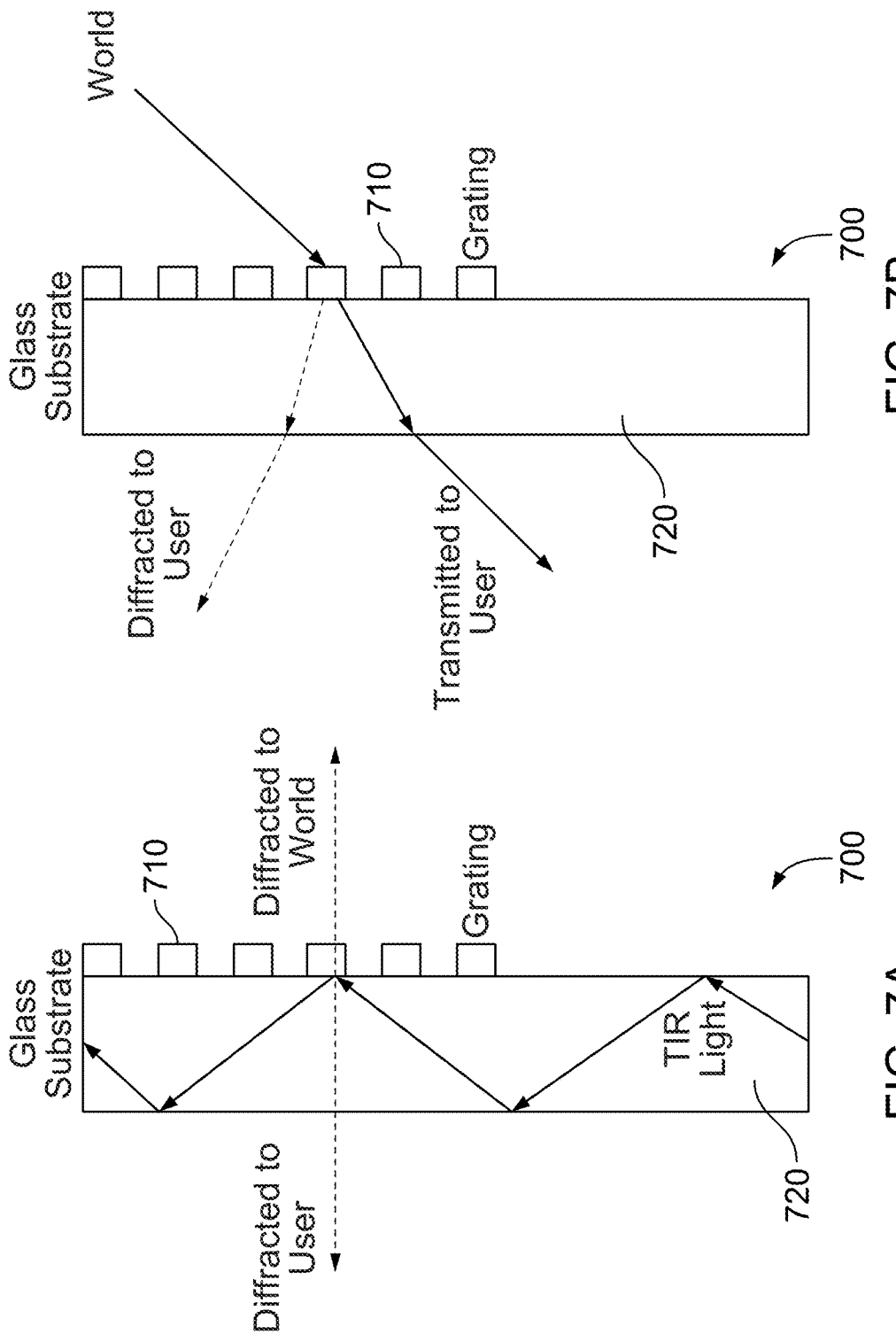

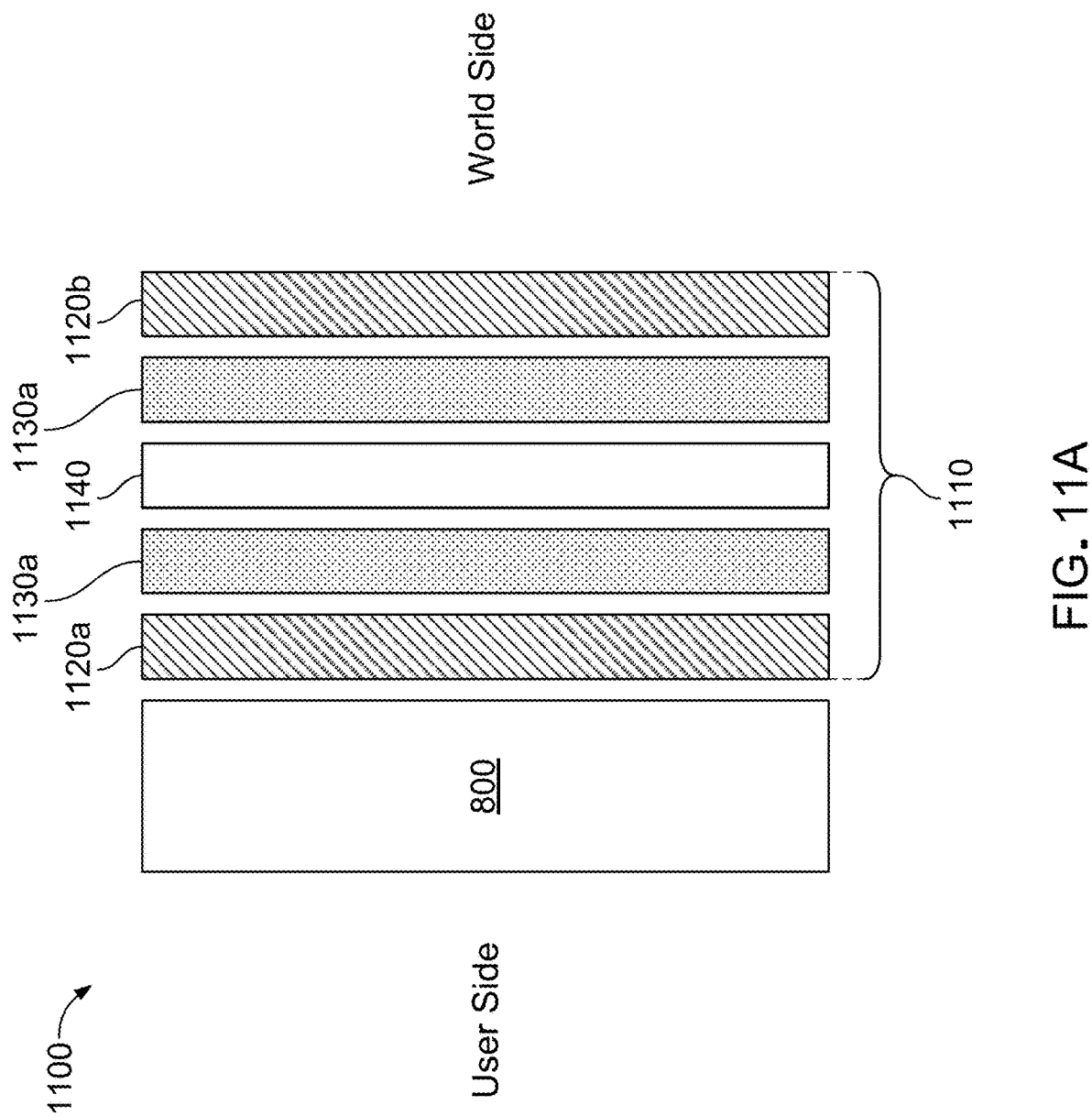

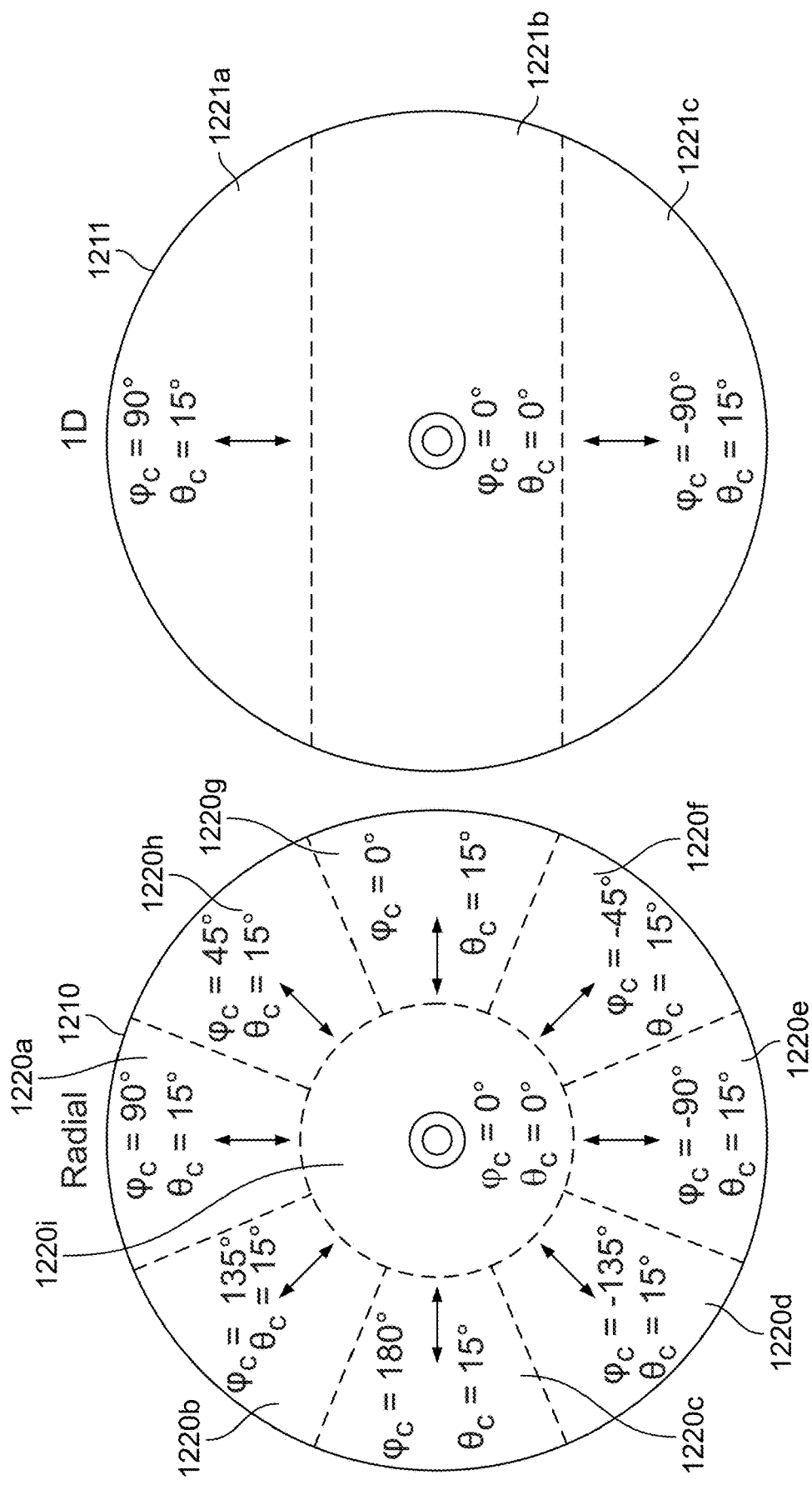

Single Stage

Two Stage

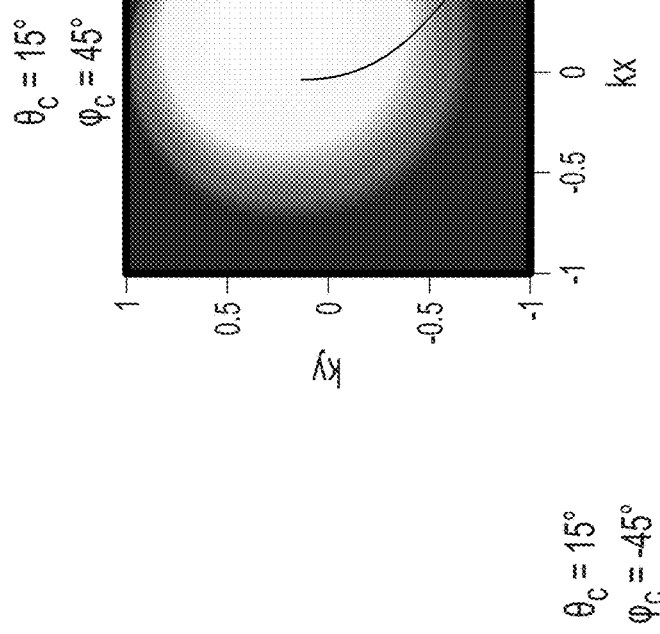
FIG. 15A
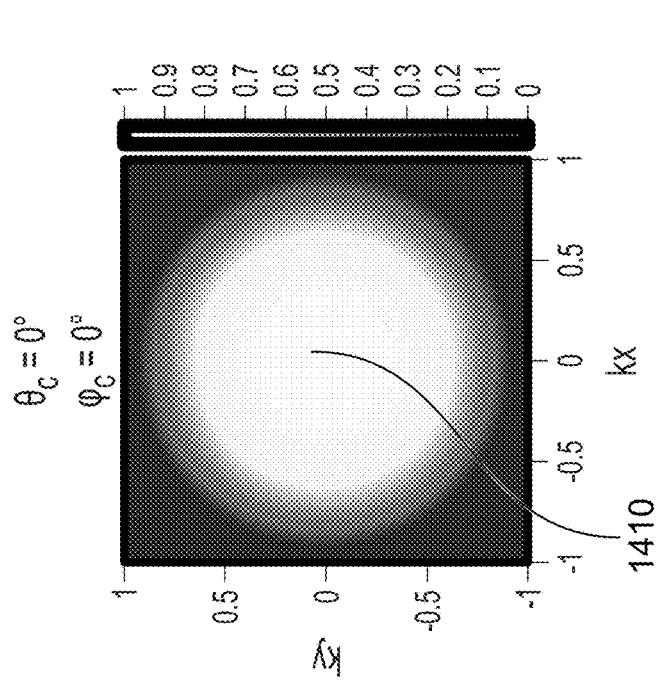
FIG. 15B
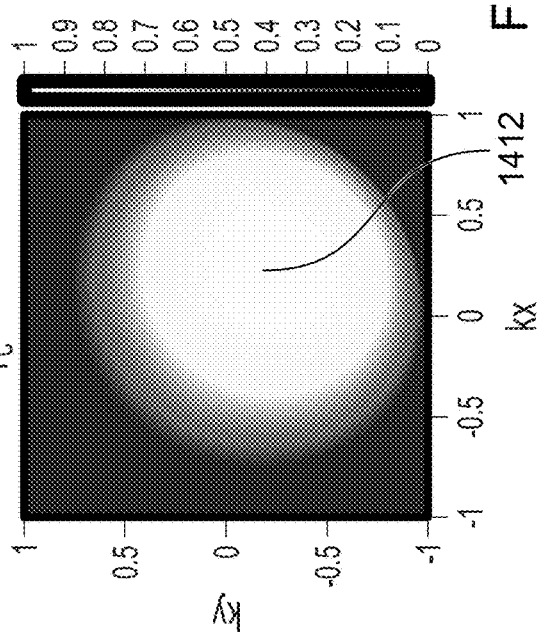
FIG. 15C
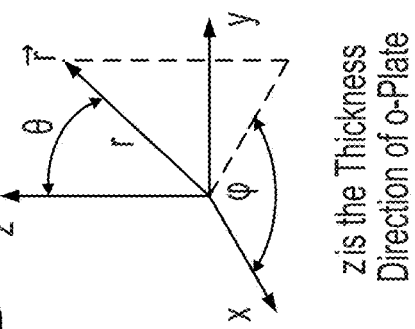

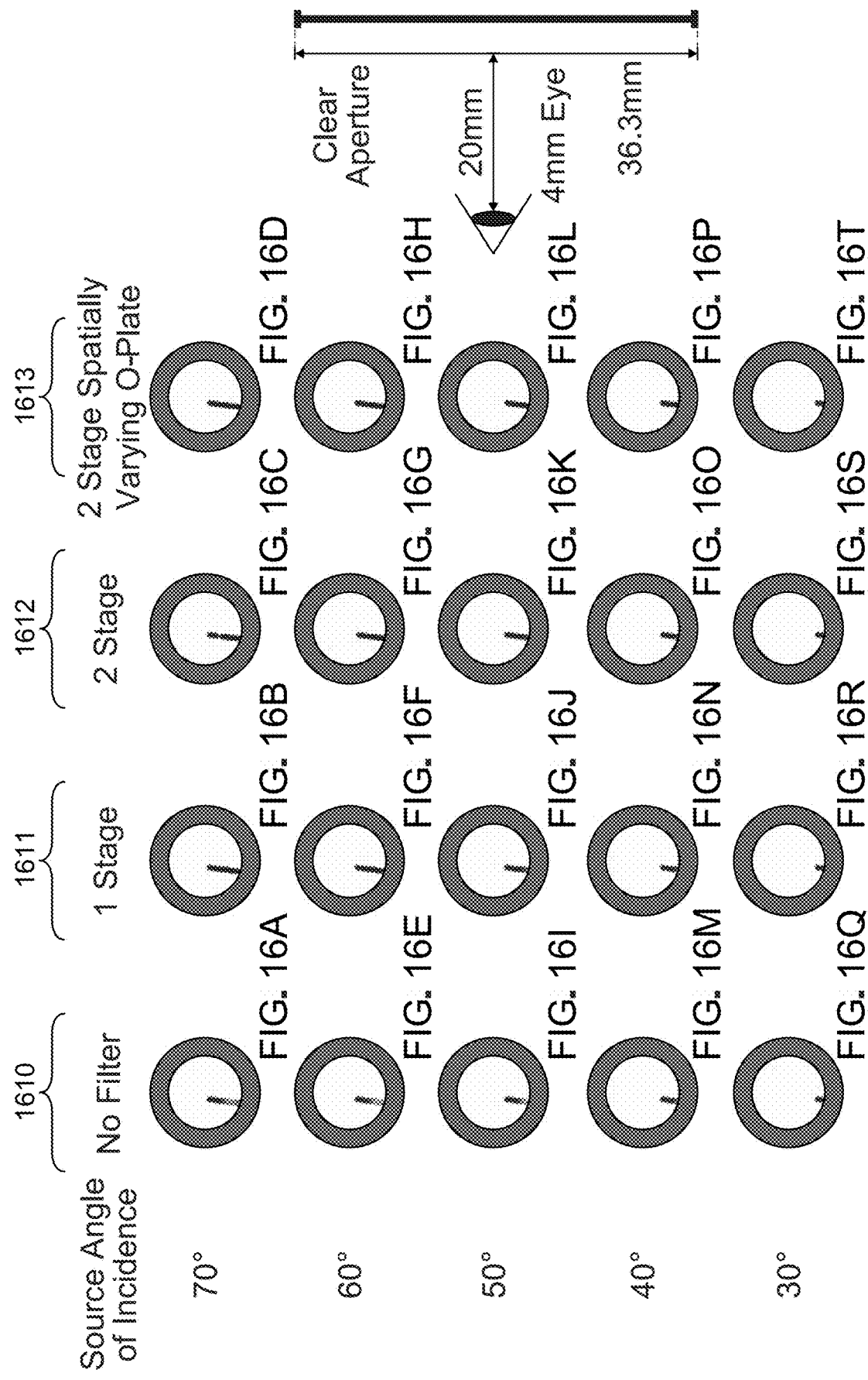

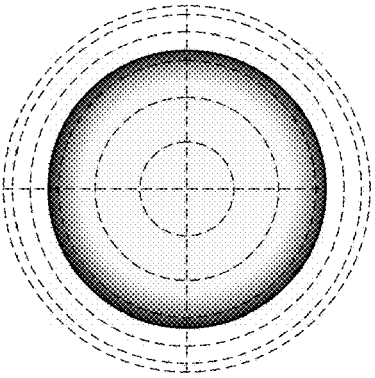
FIG. 17A No Filter
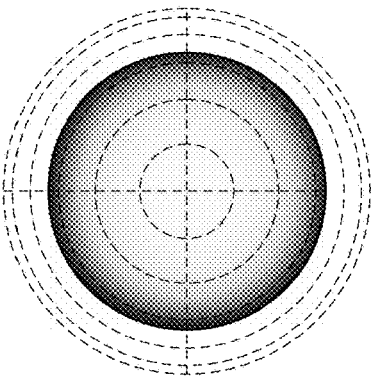
FIG. 17B 1 Stage
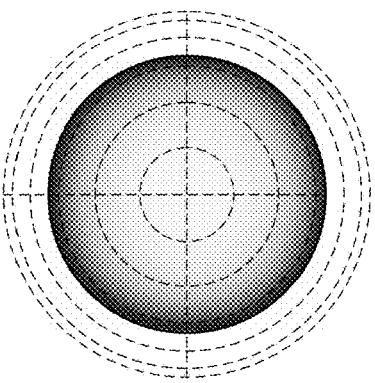
FIG. 17C 2 Stage
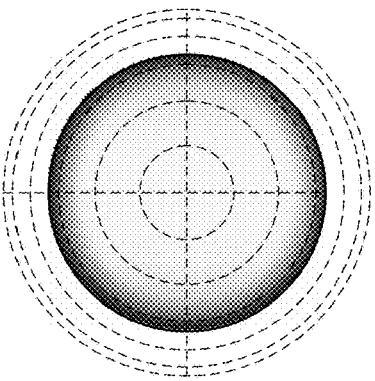
FIG. 17D 2 Stage Spatially Varying O-Plate

ANGULARLY SELECTIVE ATTENUATION OF LIGHT TRANSMISSION ARTIFACTS IN WEARABLE DISPLAYS

CROSS-REFERENCE TO RELATED APPLICATIONS

This application is a continuation application of and claims the benefit of priority to U.S. application Ser. No. 17/194,086, filed on Mar. 5, 2021, which claims priority under 35 U.S.C. § 119 to U.S. Application Ser. No. 62/986,478, filed on Mar. 6, 2020, the entire contents of each of which are incorporated by reference herein.

CROSS REFERENCE TO RELATED APPLICATION

This application claims the benefit of U.S. Provisional Application No. 62/986,478 filed Mar. 6, 2020, the contents of which are incorporated herein by reference in their entireties.

TECHNICAL FIELD

This disclosure relates to techniques for attenuation of light transmission artifacts in wearable displays.

BACKGROUND

Optical imaging systems, such as wearable display systems (e.g., wearable display headsets) can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

Multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

Optical elements in a wearable display system can also interact with ambient light, which is light from the environment that the user is in. For example, diffractive structures in a wearable display system can diffract ambient light incident on the wearable display at a high angle, which would ordinarily not enter the users field of view, into the field of view creating visible artifact that diminishes the user's experience.

SUMMARY

Wearable display systems (e.g., useful for augmented reality (AR) applications) are described that include optical attenuators to mitigate artifacts associated with ambient light incident on the display at high incidence angles. Example optical attenuators can impart different levels of attenuation to broadband light as a function of incidence angle. The optical attenuators feature spatial variations of the transmitted angular range across a clear aperture of the wearable display by changing the alignment of an optic axis of a birefringent medium in the attenuator from domain to domain of the attenuator. For instance, the director axis of a liquid crystal material used as the birefringent layer of the attenuator can be varied spatially. The optical attenuators can further improve the suppression of artifacts associated with a wearable display as well as reduce the color shift at the edges of the user's view of the world through the display compared to the solutions that utilize single domain birefringent layers.

Various aspects of the invention are summarized as follows.

In general, in a first aspect, the invention features a wearable display system, including: an eyepiece stack having a world side and a user side opposite the world side, wherein during use a user positioned on the user side views displayed images delivered by the wearable display system via the eyepiece stack which augment the user's field of view of the user's environment; and an optical attenuator arranged on the world side of the of the eyepiece stack, the optical attenuator having a layer of a birefringent material having a plurality of domains each having a principal optic axis oriented in a corresponding direction different from the direction of other domains. Each domain of the optical attenuator reduces transmission of visible light incident on the optical attenuator for a corresponding different range of angles of incidence.

Embodiments of the wearable display system can include one or more of the following features. For example, for an aperture of the eyepiece stack corresponding to an eyebox of the wearable display, a white point of images viewed through the display on the user side with a D65 illuminant on the world side varies by 0.01 $\Delta u'v'$ or less in a CIELUV color space for incident angles of 40° or less across an aperture of the display defining the eyebox. The aperture can have a diameter of 20 mm or more (e.g., 25 mm or more, 30 mm or more, 35 mm or more, 40 mm or more). The aperture can have a diameter of 50 mm or less.

The birefringent material can be a liquid crystal material and the angularly selective film can further include a pair of alignment layers on opposing sides of the liquid crystal material, wherein at least one of the alignment layers is configured to provide different pretilt angles to the liquid crystal material in the different domains of the angularly selective film. A polar pretilt angle at a domain intersecting a viewing axis of the wearable display can be zero degrees and a polar pretilt angle at least one domain away from the viewing axis is greater than zero. At least two domains with nonzero polar pretilt angles can have different azimuthal pretilt angles.

The layer of birefringent material can be a spatially-varying o-plate.

The layer of birefringent material can include domains arranged in a one dimensional pattern. Alternatively, the layer of birefringent material can include domains arranged in a two-dimensional pattern.

The layer of birefringent material can be arranged between a pair of linear polarizers. The pass axes of the two linear polarizers can be crossed. The birefringent film can rotate a polarization state of light transmitted by a first linear polarizer of the pair of linear polarizers on the world side of the polarization adjusting film. An amount of rotation of the polarization state varies depending on an angle of incidence of light transmitted by the first linear polarizer of the pair of linear polarizers. The light transmitted having large angles of incidence can be rotated less than the light transmitted having small angles of incidence. The optical attenuator can include a pair of quarter wave plates, the quarter wave plates being disposed on opposite sides of the layer of birefringent material. Each quarter wave plate can be arranged relative to a corresponding one of the linear polarizers to form a circular polarizer.

In some embodiments, the optical attenuator includes a second layer of birefringent material. The optical attenuator can further include three linear polarizers, each birefringent layer being arranged between two of the three linear polarizers. Each layer of birefringent material can be a spatially-varying o-plate. The optical attenuator can include a plurality of quarter wave plates, a pair of the quarter wave plates being arranged on opposite sides of the each layer of birefringent material.

The optical attenuator can include two or more stages, each stage having a layer of the birefringent material arranged between a pair of linear polarizers. Adjacent stages can share a linear polarizer.

The layer of birefringent material can be a switchable element having variable optical properties. The switchable element can include a liquid crystal layer between a pair of electrode layers.

Among other advantages, implementations of the invention can reduce undesirable optical artifacts (e.g., rainbow effects) in certain wearable displays associated with stray ambient light interacting with grating structures in the displays. For example, waveguide based wearable displays (e.g., for AR/MR applications) that employ surface relief gratings can diffract stray ambient light into the eyebox of the display, resulting in unwanted artifacts in the user's field of view, diminishing the user's experience. Implementations of the invention can significantly reduce such artifacts without significantly impacting the user's viewed field.

Implementations can attenuate the transmission of ambient light based on its angle of incidence and location of incidence in the eyebox. For instance, an attenuator that selectively attenuates light for angles of incidence larger than the user's field-of-view can mitigate the visibility of the artifacts generated by the diffractive near-eye-display without sacrificing the transmission of the user's view of the world.

The details of one or more embodiments are set forth in the accompanying drawings and the description below. Other features and advantages will be apparent from the description and drawings, and from the claims.

BRIEF DESCRIPTION OF DRAWINGS

FIGS. 7A and 7B are schematic diagrams illustrating light paths through a display combiner having a surface relief grating.

FIGS. 11A and 11B are examples of an eyepiece with a single O-plate and a spatially varying O-plate.

FIGS. 12A and 12B are further examples of spatially varying O-plates.

FIGS. 15A-15C are intensity plots of calculated transmission profiles of example O-plates.

FIGS. 16A-16T are images of calculated attenuations of optical rainbow artifacts.

FIGS. 17A-17D are images of calculated color shifts.

Among the drawings, like labels indicate like elements.

DETAILED DESCRIPTION

Figure 1:
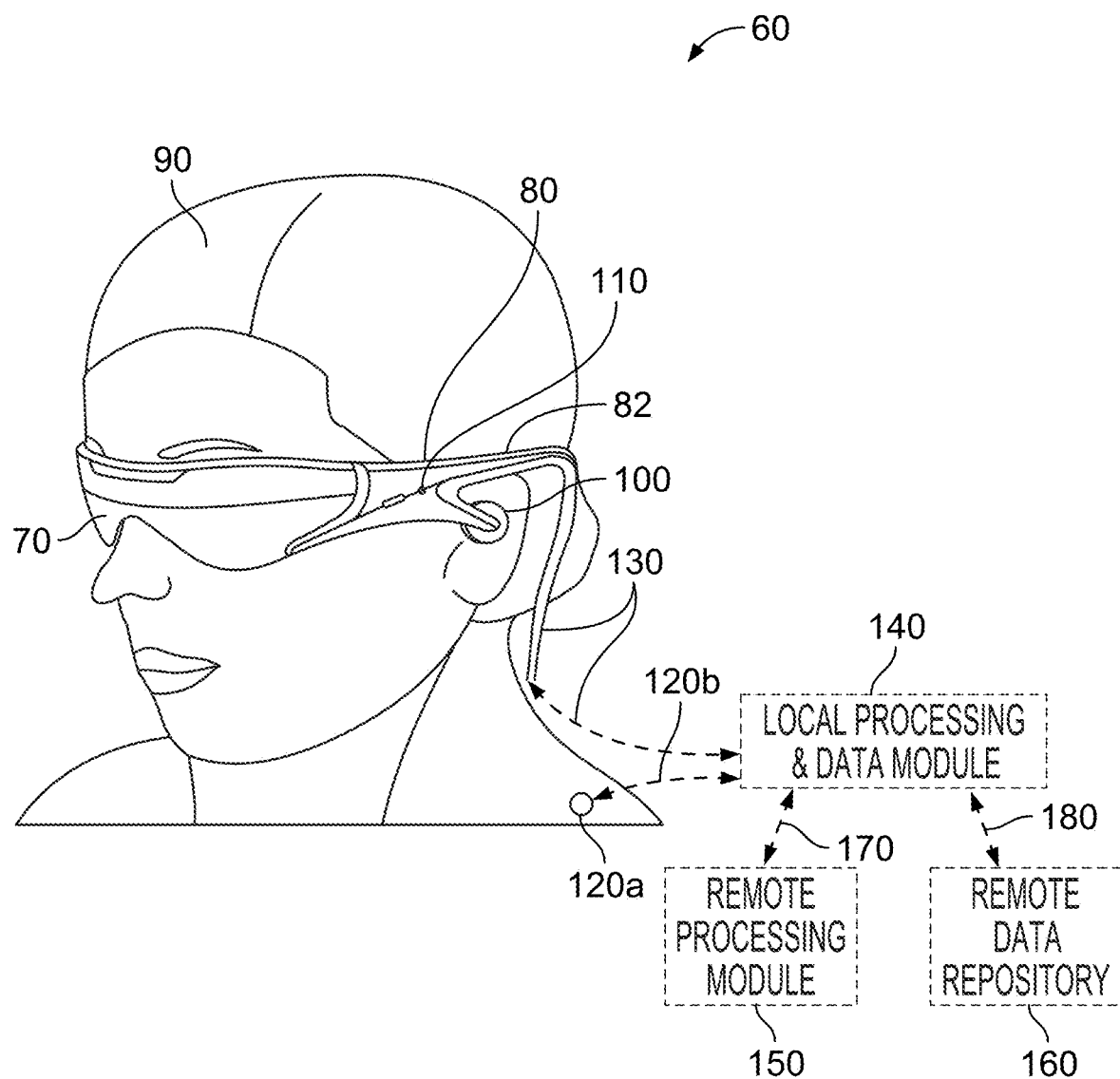
FIG. 1 shows an example of a wearable display system.

FIG. 1 illustrates an example wearable display system 60 that includes a display or eyepiece 70, and various mechanical and electronic modules and systems to support the functioning of that display 70. The display 70 is housed in a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120a, which may be separate from the frame 80 and attached to the body of the user 90 (e.g., on the head, torso, an extremity, etc.). The peripheral sensor 120a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120a may be operatively coupled by communications link 120b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the interne or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Figure 2A:
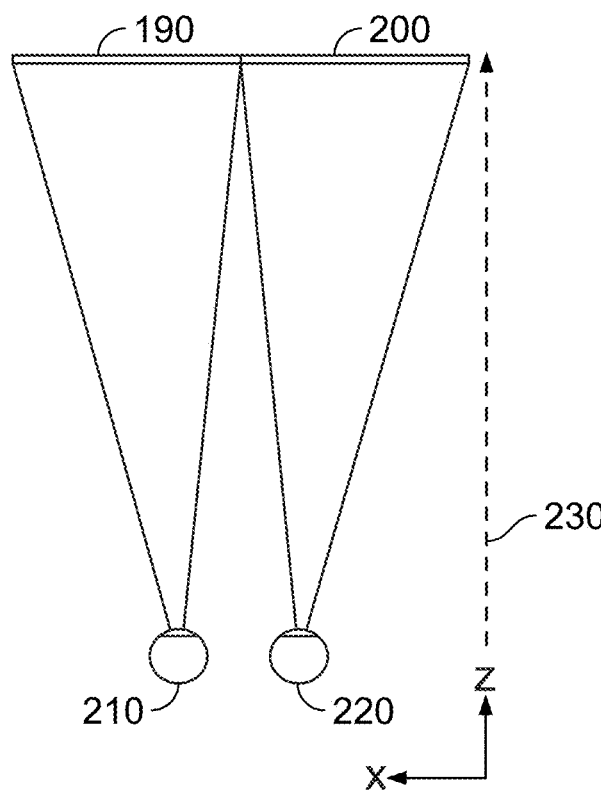
FIG. 2A shows a conventional display system for simulating three-dimensional image data for a user.

The perception of an image as being "three-dimensional" or "3-D" may be achieved by providing slightly different presentations of the image to each eye of the user. FIG. 2A illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

Figure 2B:
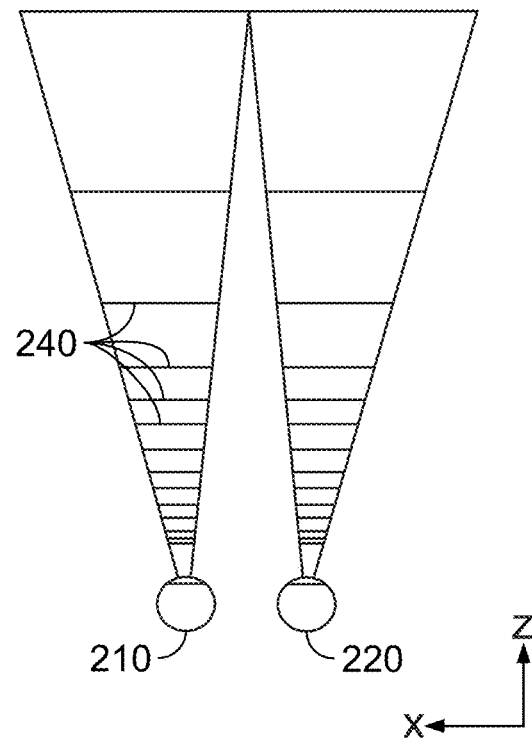
FIG. 2B shows aspects of an approach for simulating three-dimensional image data using multiple depth planes.

FIG. 2B illustrates aspects of an approach for simulating three-dimensional image data using multiple depth planes. With reference to FIG. 2B, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 3A:
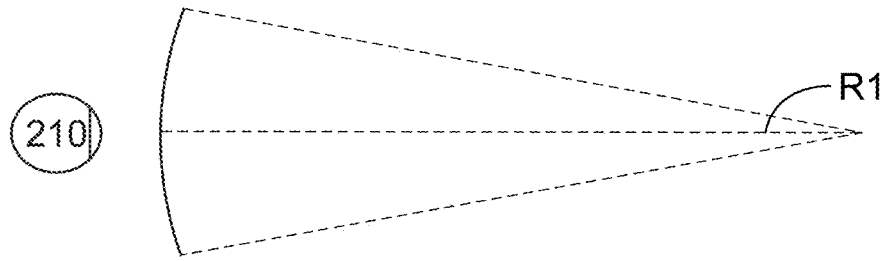
FIGS. 3A-3C show relationships between radius of curvature and focal radius.
Figure 3B:
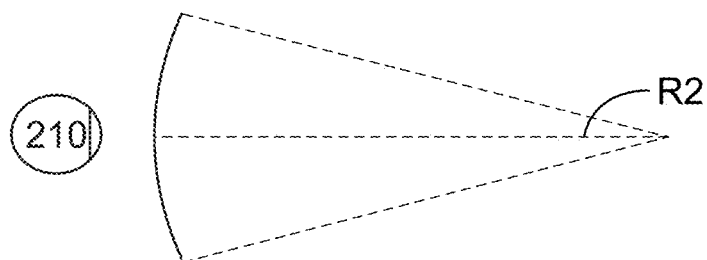
Figure 3C:
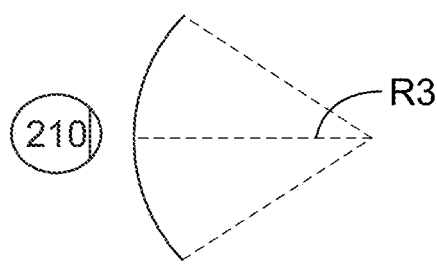

The distance between an object and an eye 210 or 220 may also change the amount of divergence of light from that object, as viewed by that eye. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 3A-3C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Figure 4:
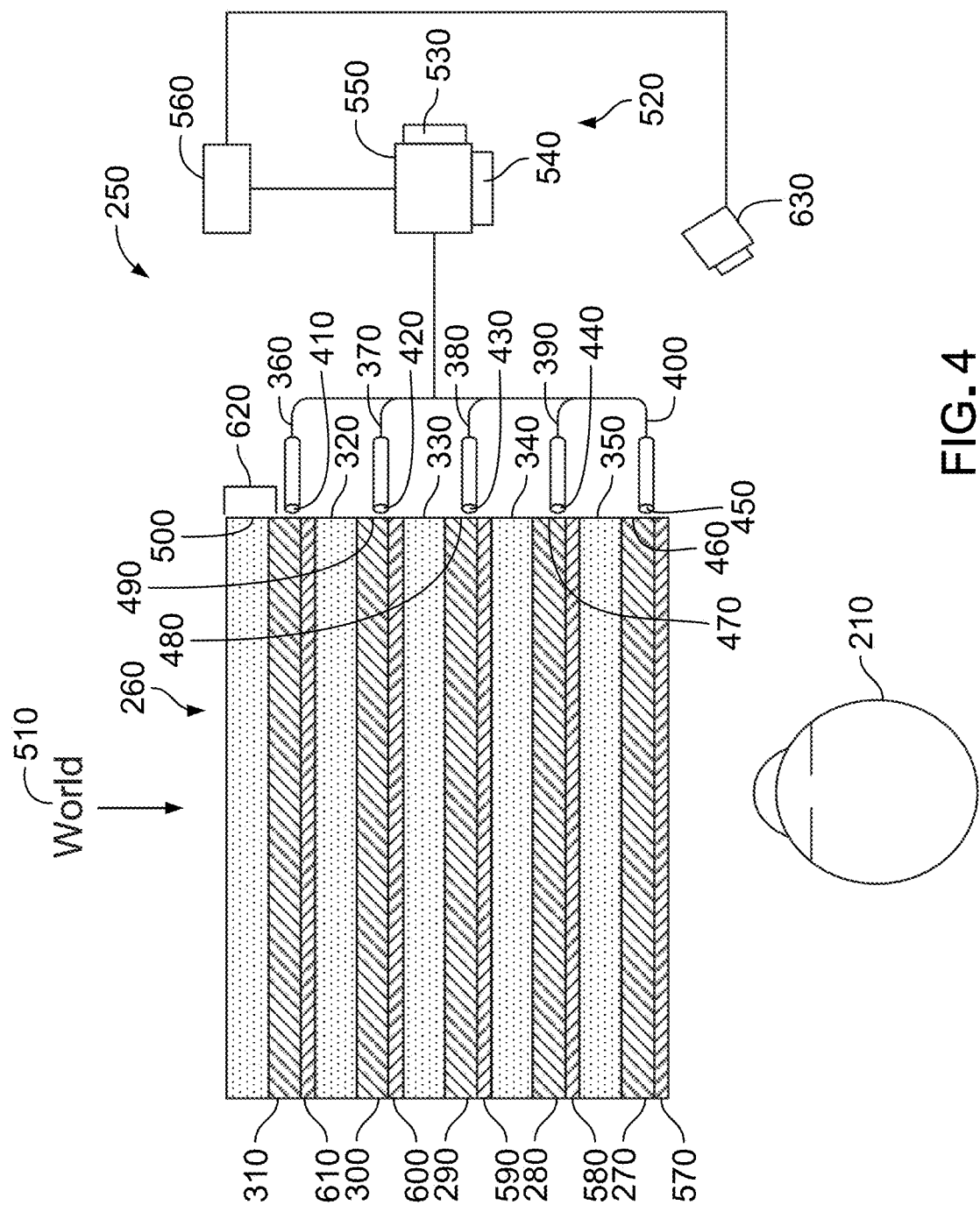
FIG. 4 shows an example of a waveguide stack for outputting image information to a user in an AR eyepiece.

FIG. 4 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 1, with FIG. 4 schematically showing some parts of that system 60 in greater detail. For example, the waveguide assembly 260 may be part of the display 70 of FIG. 1. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g., a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300,310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and digital light processing (DLP) displays.

In some embodiments, the light projector system 520, or one or more components thereof, may be attached to the frame 80 (FIG. 1). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270, 280, 290, 300, 310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programing (e.g., instructions in a non-transitory medium) that regulates the timing and provision of image information to the waveguides 270, 280, 290, 300, 310. In some embodiments, the controller may be a single integral device, or a distributed system connected by wired or wireless communication channels. The controller 560 may be part of the processing modules 140 or 150 (FIG. 1) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 1) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 5:
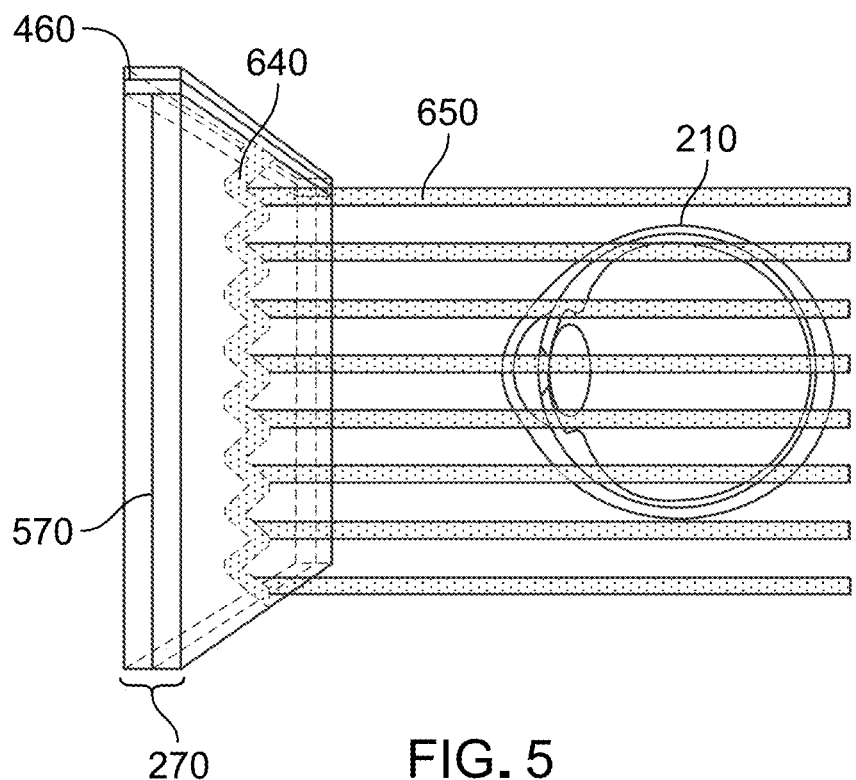
FIGS. 5 and 6 show examples of exit beams outputted by a waveguide.
Figure 6:
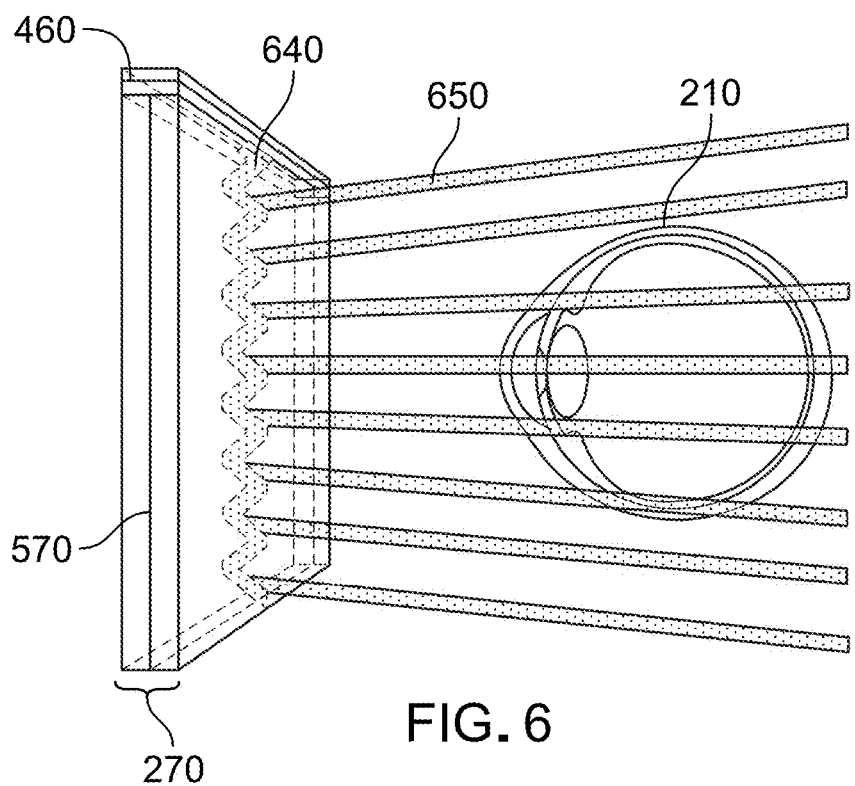

FIG. 5 illustrates an example of exit beams output by a waveguide. One waveguide is illustrated (with a perspective view), but other waveguides in the waveguide assembly 260 (FIG. 4) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 6 but, as discussed herein, some amount of optical power may be imparted depending on the depth plane associated with the waveguide 270. Parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 6, which would require the eye 210 to accommodate to a closer distance to bring it into focus on the retina and would be interpreted by the brain as light from a distance closer to the eye 210 than optical infinity.

Additional information regarding wearable display systems (e.g., including optical elements used in wearable display systems) can be found in U.S. Patent Publication No. U.S. 2019/0187474 A1, filed Dec. 14, 2018, and entitled "EYEPIECES FOR AUGMENTED REALITY DISPLAY SYSTEM," the contents of which are incorporated by reference in their entirety.

As noted above, wearable display system 60 includes one or more optical elements having one or more grating structures that enhance an optical performance of the wearable display system. For example, referring to FIGS. 7A and 7B, a diffractive relief structure, grating 710, is used with a near-eye display combiner 700 (e.g., a stacked waveguide assembly as described above) as an exit pupil expander (EPE), increasing the size of the wearable display system's exit pupil. As illustrated in FIG. 7A, combiner 700 includes a waveguide 720 (e.g., a glass or polymeric substrate) that guides edge-coupled light via total-internal-reflection (TIR) along its length while grating 710 diffracts incident guided light so that at least some of the light is extracted from waveguide 720 towards the user of the display system.

Referring specifically to FIG. 7B, ambient light from the user's environment is also incident on display combiner 700 from the "world" side. This light interacts with grating 710 and at least some of this light can be diffracted into the user's field of view. When viewed by the user through the EPE, the light diffracted from the world can appear as an undesirable image artifact. The angles-of-incidence which generate artifacts in the user's field-of-view generally depends on the design on the display combiner. For diffractive waveguide based display combiners, large angles-of-incidence often result in stray light paths nearest the center of the user's world field-of-view.

Figure 8B:
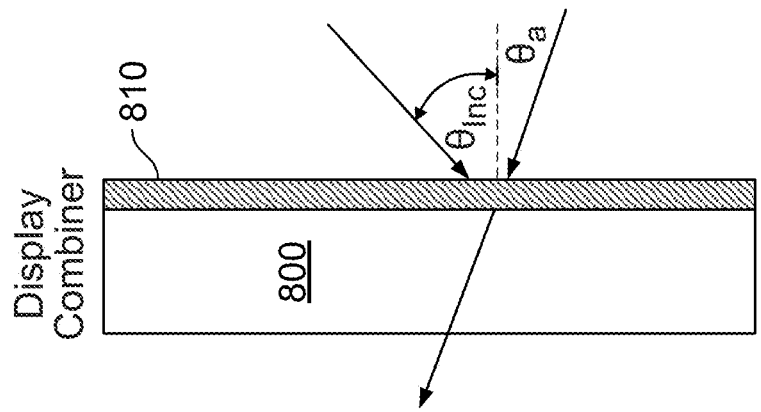
FIGS. 8A and 8B are schematic diagrams comparting light transmission through a display combiner with and without an optical attenuator.
Figure 8A:
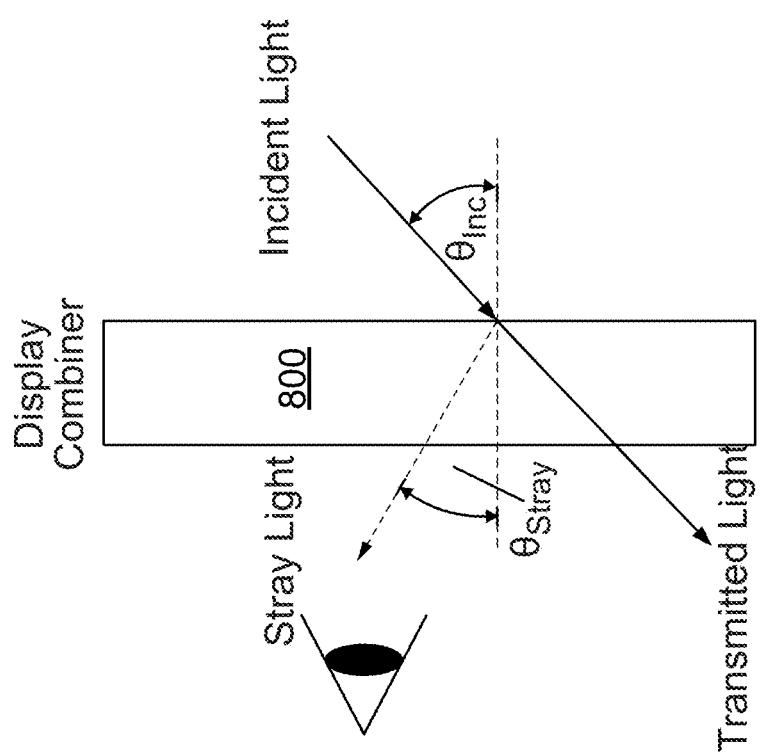

This effect is further illustrated in FIG. 8A, which shows a display combiner 800. Ambient light is incident on a front surface of display combiner 800 at an incident angle $\theta_{inc}$. At least some of the incident light is transmitted through the grating and the combiner as illustrated. However, display combiner 800 supports a grating (not shown) that diffracts at least some of the incident light toward the user. This light, labeled stray light, diffracts at an angle $\theta_{stray}$.

Referring to FIG. 8B, an optical attenuator, e.g., film 810, can be applied to (e.g., laminated onto) display combiner 800 to reduce stray light artifacts associated with ambient light. Generally, the transmission of light through film 810 depends on the angle of incidence of the light on the film. As illustrated, film 810 reduces (e.g., blocks) transmission of light having an angle of incident $\theta_{inc}$, that is relatively high (e.g., 30° or more, 35° or more, 40° or more, 45° or more, e.g., such as a user would experience from overhead lighting in indoor environments) but transmits light having a lower angle of incidence, $\theta_a$ (e.g. "world light" seen by the wearer in the core field of view of the device), The film 810 can perform this function over a broad range of wavelengths, e.g., over the operative wavelength range of the display system, such as from 420 nm to 680 nm.

The transmission efficiency for incident light generally varies as a function of incident angle from relatively high transmission efficiency (e.g., 40% or more, 45% or more) to a relatively low transmission efficiency (e.g., less than 1%, less than 0.5%). Transmission efficiency refers to the relative intensity of light transmitted at a particular wavelength. In some embodiments, unpolarized light of wavelength in a range from 420 nm to 680 nm incident of the optical attenuator with an angle of incidence between 35° and 65° has a transmission efficiency less than 0.5%. In certain embodiments, unpolarized light of wavelength in a range from 420 nm to 680 nm incident of the optical attenuator with an angle of incidence between −32° and +32° has a transmission efficiency greater than 45%.

The optical attenuator can also have a relatively small impact on the color of images viewed through the film. For example, for a D65 source, the optical attenuator can shift a (0.33, 0.33) CIE 1931 white point less than (+/−0.02, +/−0.02) (e.g., (+/−0.01, +/−0.01) or less) for unpolarized light with an angle of incidence between −32° and +32° across the entire aperture of the display.

Transmission of the optical attenuator can also be characterized by attenuation, which can be high for relatively high incident angles (e.g., 10 dB or more, 15 dB or more, 20 dB or more, 25 dB or more, 30 dB or more). Light at lower incident angles, such as 25° or less (e.g., 20° or less, 15° or less, 10° or less) can experience very low levels of attenuation (e.g., 2 dB or less, 1 dB or less).

Generally, film 810 can be relatively thin. For example, film 810 can have a total thickness in a range from 500 microns to 2,000 microns. Accordingly, the benefits of using the optical attenuator can be achieved without adding significant bulk to the wearable display system.

In some embodiments, film 810 is a film stack that includes a polarization adjusting film (e.g., composed of one or more birefringent layers) arranged between pair of polarizer films (e.g., linear polarizers). The polarizer films and polarization adjusting film significantly reduces transmission of visible light incident on film 810 at large angles of incidence without significantly reducing transmission of light incident on the optical attenuator at small angles of incidence.

In general, the configuration of the two polarizers and the polarization adjusting film can vary to provide a desired level of transmission variation over an angular incidence range of interest (e.g., from −75° to)+75°. In some embodiments, the polarizers are linear polarizers and the pass axes of the two linear polarizers can be crossed (e.g., at) 90°.

Generally, the polarization adjusting film includes one or more birefringent layers that are designed to rotate a polarization state of light transmitted by a first of the pair of linear polarizers incident from the world side. The birefringent layers can include A-plates, in which an extraordinary axis of the birefringent material is parallel to a plane of the layer, (e.g., a quarter waveplate (QW)) and/or C-plates, in which an extraordinary axis of the birefingent material is perpendicular to the plane of the layer, and example arrangements are shown below. More generally, birefringent layers can include uniaxial (e.g., as A-plates or C-plates) or biaxial birefringent materials.

Typically, the amount that the polarization adjusting layer rotates the polarization state varies depending on the configuration of the polarization adjusting layer and depending on an angle of incidence of light transmitted by the first of the pair of linear polarizers. In some embodiments, the light transmitted having large angles of incidence (e.g., 35° or more) is rotated less than the light transmitted having small angles of incidence (e.g., less than)35°. For example, where the polarizers are crossed linear polarizers, the greater the amount of rotation, up to 90°, the greater then transmission efficiency of the film. In such cases, greater rotation for on-axis light compared to light at larger incident angles, is desirable. Conversely, in some embodiments, the polarizer axes are parallel and the polarization adjusting film rotates on-axis light less than light at larger incident angles.

Generally, the optical attenuator is sized appropriately to cover at least a portion of the eyepiece of the wearable display system. For example, in some embodiments, the optical attenuator can have an area greater than 50 mm×50 mm.

Figure 9B:
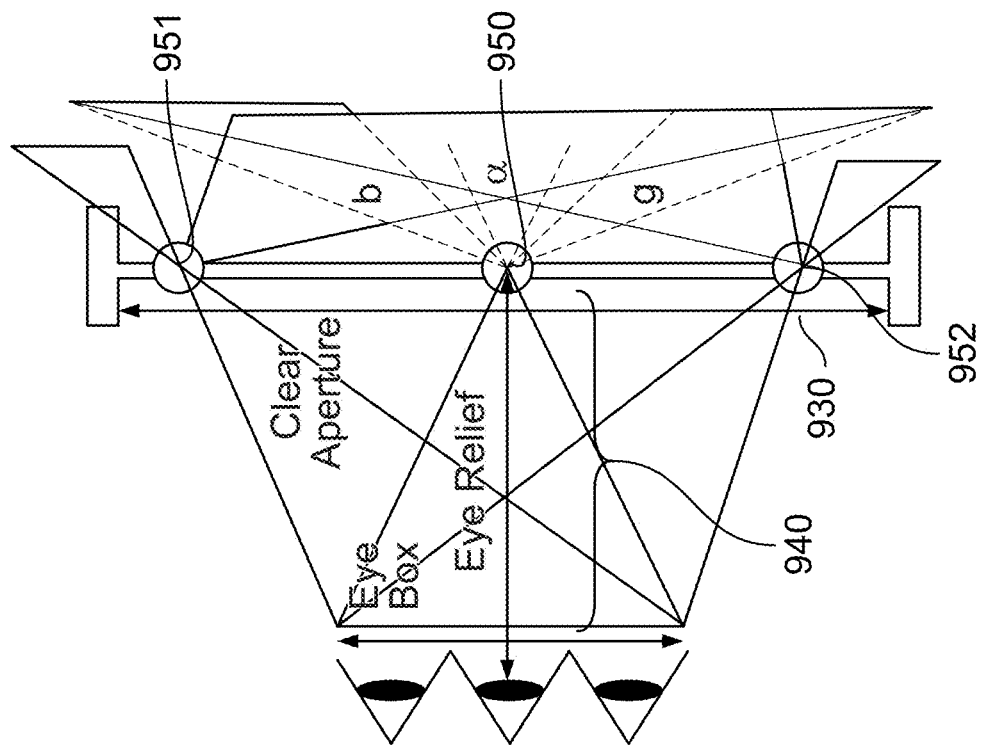
FIGS. 9A and 9B are diagrams displaying the eyebox and related world transmission angles.
Figure 9A:
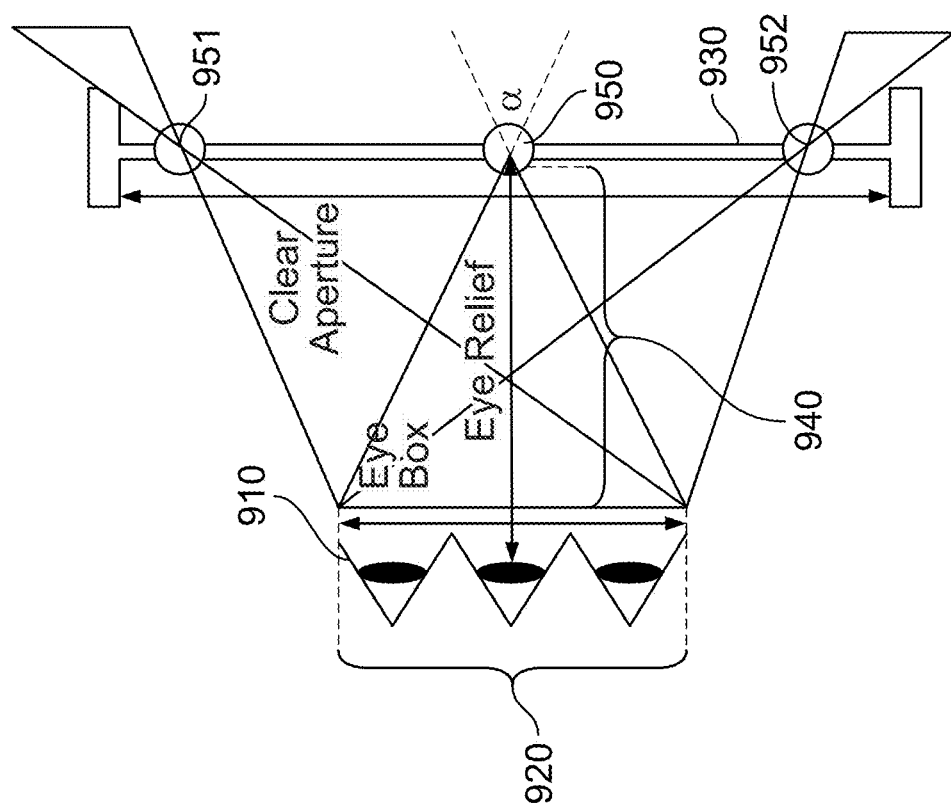

In general, the ambient light diffracted by a uniform grating into a user's eyebox will depend on the location in the display's clear aperture on which the light is incident. This effect is illustrated in FIGS. 9A and 9B, depicting the incidence plane of clear eyepiece and an eyepiece including a grating element, respectively. The eyebox 920 refers to the volume of space within which an effectively viewable image is formed by the display. The eyebox's dimensions generally depends on the pupil size and eye relief distance 940. In FIG. 9A, a vertical dimension of the eyebox for user's eye 910 is denoted 920. Generally, this dimension can be in a range from about 5 mm to about 25 mm. An eye relief distance 940 refers to the offset distance of eye 910 from eyepiece 930 and may generally be in a range from 10 mm to 40 mm from the vertical center point 950. As illustrated for the vertical incidence plane in FIG. 9A, the angles of incidence of light transmitted by eyepiece 930 into eyebox 920 depend on the location at which the light is incident on the eyepiece. In particular, this is illustrated for three different points, 950, 951, and 952. The range of incidence angles for which light is transmitted at point 950 is denoted by α. This range is different for each point.

Referring to FIG. 9B, the grating at each point 950, 951, and 952 also diffracts incident ambient light into eyebox 920. For each case, the incident angular ranges for which ambient light is diffracted into the eyebox will be different. For example, at point 950, eyepiece 930 diffracts incident light within first angular range β and second angular range γ into eyebox 920. Additional points 951, and 952 will diffract incident light into the eyebox within respective angular ranges.

Figure 10:
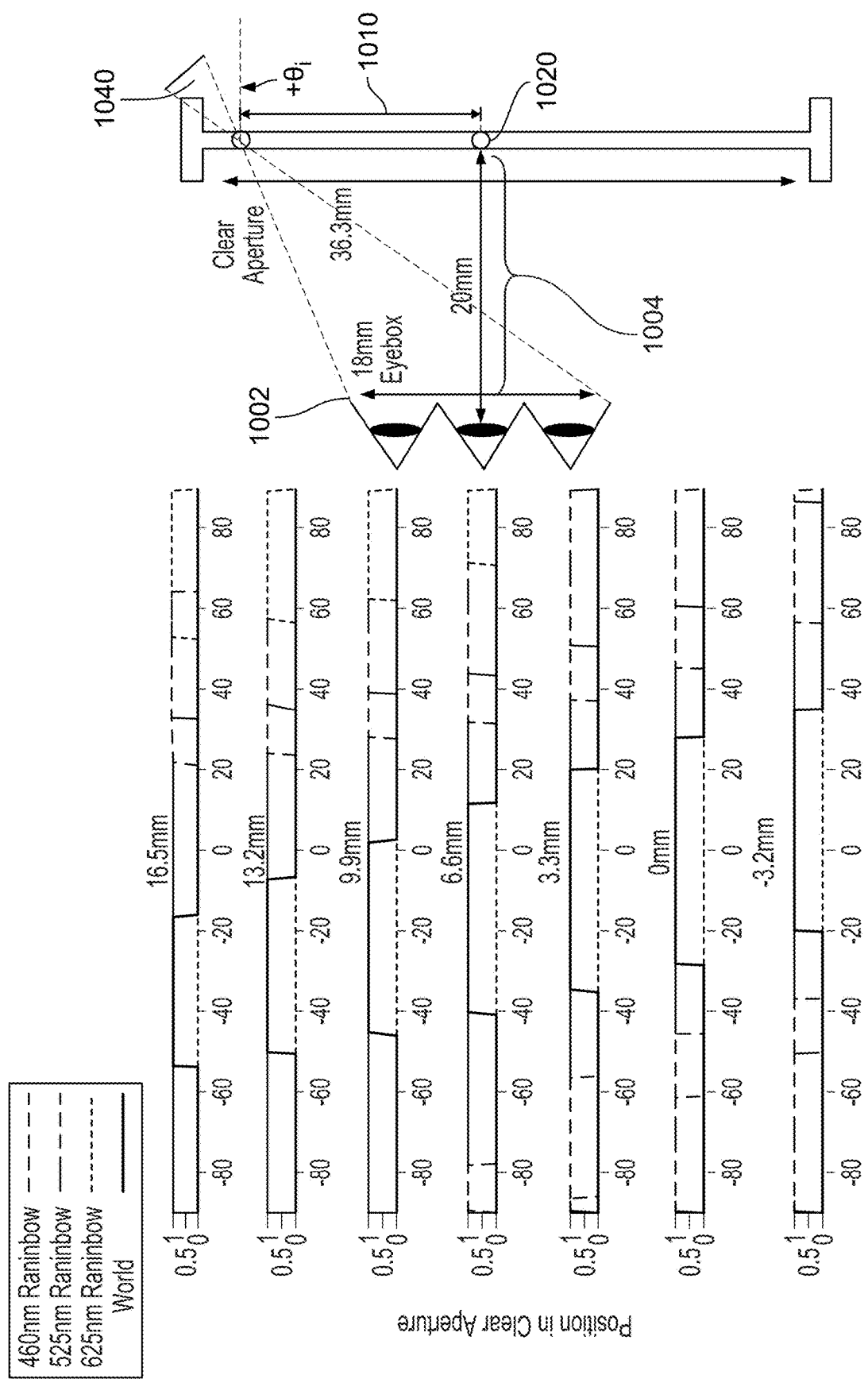
FIG. 10 is a series of plots showing world transmission and artifact generation profiles.
Figure 10:
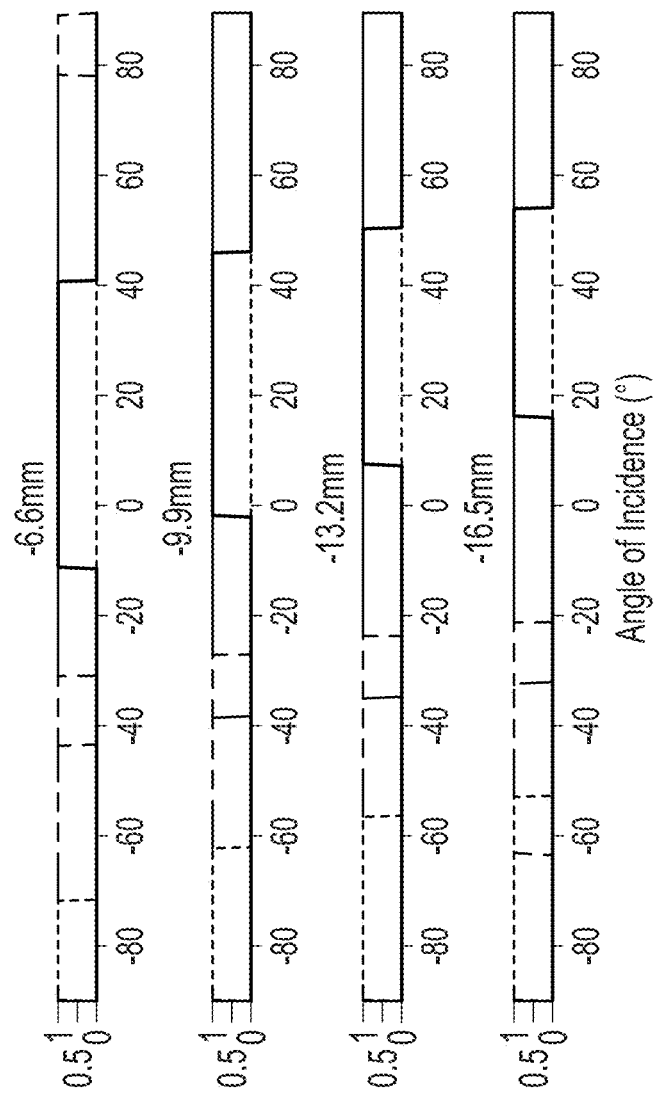

This location dependence of diffracted incident light is further illustrated by the plots in FIG. 10 which show a series of simulated plots, each plot being a representation of the transmission and diffraction properties of an eyepiece at a corresponding vertical location. In particular, the angular ranges of incidence of transmitted light incident on the world side is provided in black and the angular ranges of incidence of diffracted light that generate rainbow artifacts at specific wavelengths are provided in red (625 nm), green (525 nm), and blue (460 nm), respectively.

The plots of on the left were calculated based on the incidence plane shown on the right side of FIG. 10, including the clear aperture and eyebox 1002. Each plot is calculated (e.g., simulated) based on an eyebox 1002 vertical size of 18 mm, an eye relief 1004 of 20 mm, a clear aperture 1006 vertical size of 36.3 mm. The clear aperture 1006 is simulated to include a grating element having a grating period of 391 nm, with grating lines extending in the horizontal direction (e.g., perpendicular to the plane of the page). The title of each plot, positioned above each plot, denotes the vertical location at which the transmission and artifact windows are calculated, given in vertical height 1010 from the center point 1020 expressed in mm, positive values being above the center point 1020 and negative values being below. The vertical axis for each graph is a normalized value (e.g. from 0 to 1) expressing high transmission (black) or high generation of diffraction artifacts (red, blue, green). The horizontal axis for each graph represents the angle of incidence of ambient light ($\theta_i$) with respect to a ray 1030 normal to the face of the clear aperture, with positive values of $\theta_i$, being measured clockwise from the normal ray 1030. For example, the shaded area 1040 is the world transmission window calculated at a point 16.6 mm above the center point 1020 and corresponds with the range of ~−16° to −55° as shown in the top-most graph.

Accordingly, in such situations, it may be desirable to use an optical attenuator which attenuates different angular ranges of incident light from the world side depending on the location on the eyepiece at which the light is incident. This can improve the reduction in diffracted light artifacts across the entire eyepiece without substantially reducing transmission of incident world light that is admitted to the eyebox.

Turning now to specific examples of such optical attenuators and with reference to FIG. 11A, an eyepiece 1100 for a wearable display system includes display combiner 800 and a film stack 1110 that operates as an optical attenuator. Stack 1110 includes a pair of linear polarizers 1120a and 1120b. Between the linear polarizers, stack 1110 includes a pair of quarter waveplates (QWs) 1130a and 1130b on either side of a multi-domain birefringent film 1140.

The fast axes of the waveplates 1130a and 1130b are oriented at approximately 45° to the pass axes of linear polarizers 1120a and 1120b, respectively, so that the combination of linear polarizer 1120b and QW 1130b convert unpolarized light incident from the world side to substantially circularly polarized light (i.e., the combination behaves as a circular polarizer). The combination of QW 1130a and linear polarizer 1120a behave similarly. Note the handedness of each circular polarizer are the same.

Figure 11B:
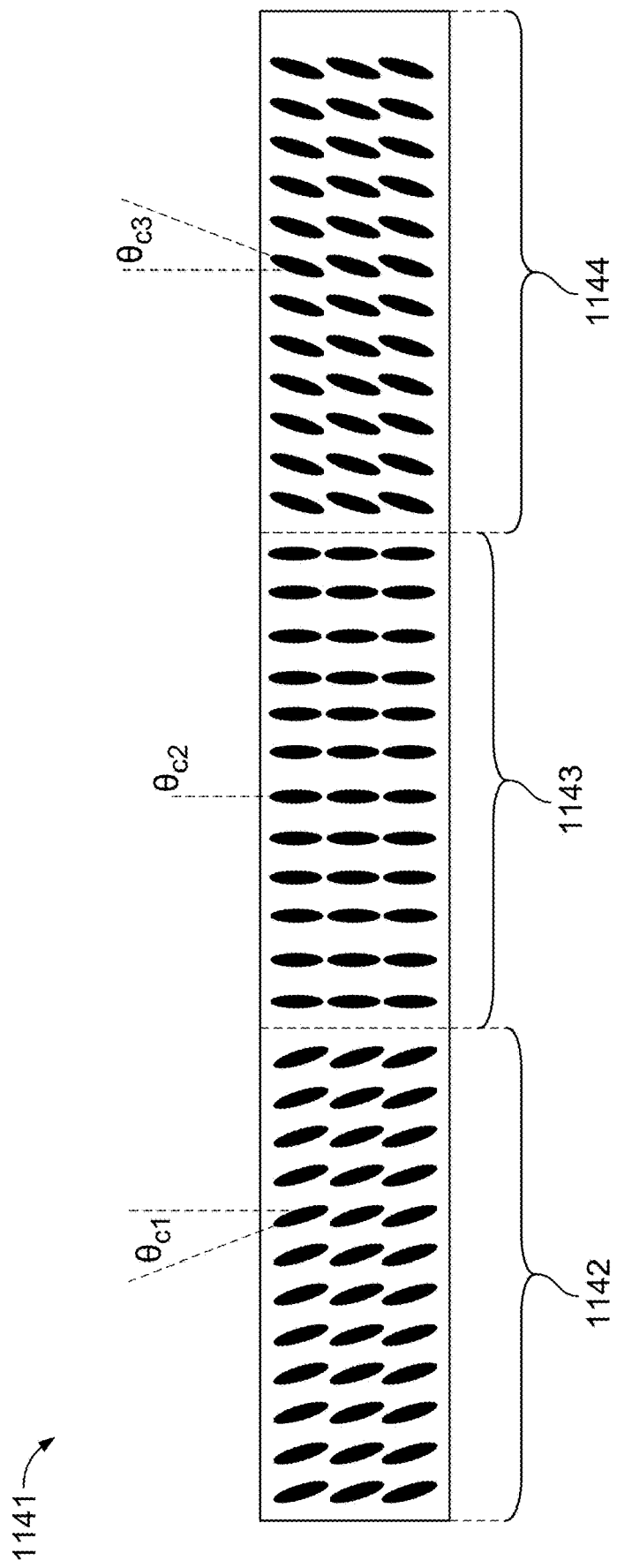

Multi-domain birefringent film 1140 includes different areas in which the principal optic axes of the birefringent material composing the film are differently oriented such that the transmission properties of film stack 1110 vary from domain to domain. For example, in some embodiments, birefringent film 1140 is a liquid crystal birefringent film composed of domains of a nematic liquid crystal material in which the director varies from domain to domain. Referring to FIG. 11B, an example of such a film is film 1141, which has three domains 1142, 1143, and 1144 which each have their own unique director axis such that $\theta_{c1} \neq \theta_a \neq \theta_{c3}$ where $\theta$ is the azimuthal angle difference measured from normal to the plane of the film. Orientations where the director axis of one or more spatial regions varies by a radial angle difference, $\phi$, are also possible (e.g., $\theta_c$, $\phi_c$). More generally, birefringent films having an optic axis oriented non-perpendicular and non-parallel to the plane of the film are commonly referred to as an O-plate and an O-plate having multiple domains, such as film 1141, may be considered a spatially-varying O-plate.

The orientation of the nematic director in a film can be achieved through a number of techniques. For example, the alignment is generally influenced by the pretilt angle (the angle of the director at a surface of the film) and/or application of external fields, such as electric fields. Pretilt can be set in a variety of ways (e.g. mechanical buffing, exposure to linearly polarized light), to achieve a range of azimuthal and radial pretilt directions (e.g., $\theta_c$, $\phi_c$). The range of the azimuthal orientation $\theta_c$ may range from −90° to 90° from the normal axis of the O-plate and the range of the radial orientation $\phi_c$ may range from −180° to 180° from the x-axis. These techniques may be applied to distinct spatial domains on an O-plate so that each domain has a different pretilt.

In general, spatial domains may take on any form or size, or be of any number. The director axes of spatial regions may be aligned radially, concentrically, directionally, or any combination thereof, between spatial regions. FIGS. 12A and 12B show examples of such embodiments. FIG. 12A shows an example spatially varying O-plate 1210 with nine distinct spatial domains 1220a-1220i separated by dashed lines each with a unique director axis, the axial direction of which is defined by a ($\theta_c$, $\phi_c$) value. Eight director axes 1220a-1220h are arranged to radially process around the central axis, normal to the face of the spatially varying O-plate 1210, and one director axis 1220i is aligned normal to the face of the spatially varying O-plate 1210, equivalent to a C-plate. The eight director axes of spatial regions 1220a-1220h share a common azimuthal orientation $\theta_c$ of 15° and the radial orientations $\phi_c$ are distributed bilaterally from 0° to 180° in 45° increments (e.g. 0°, ±45°, ±90°, ±135°, 180°) from the x-direction.

FIG. 12B shows a further example of a spatially varying O-plate 1211 with three distinct spatial domains 1221a-1221c separated by dashed lines. Spatial domains 1221a-1221c are aligned horizontally with no radial distribution. The director axes of spatial regions 1221a and 1221c share a common azimuthal tilt $\theta_c$ of 15° while the radial angles $\phi_c$ are aligned in polar opposite directions, parallel to the face of the spatially varying O-plate 1211 at −90° and 90°. The director axis of the middle spatial region 1221b one is aligned normal to the face of the spatially varying O-plate 1210.

FIGS. 12A and 12B are specific examples of the arrangements of spatial regions that may be achieved in spatially varying O-plates 1140 used in an optical attenuator film stacks 1110, though they are not limiting examples of further embodiments. More generally, other one dimension and two dimension domain arrangements can be adopted. In general, strong ambient light sources occur more frequently overhead, and reflections thereof from below, and the simplified design of 12B may be the preferred embodiment for the attenuation of overhead artifacts. However, the radial design of 12A may be used to attenuate artifacts generated by light sources from any conical angle within view of the user.

Figure 13:
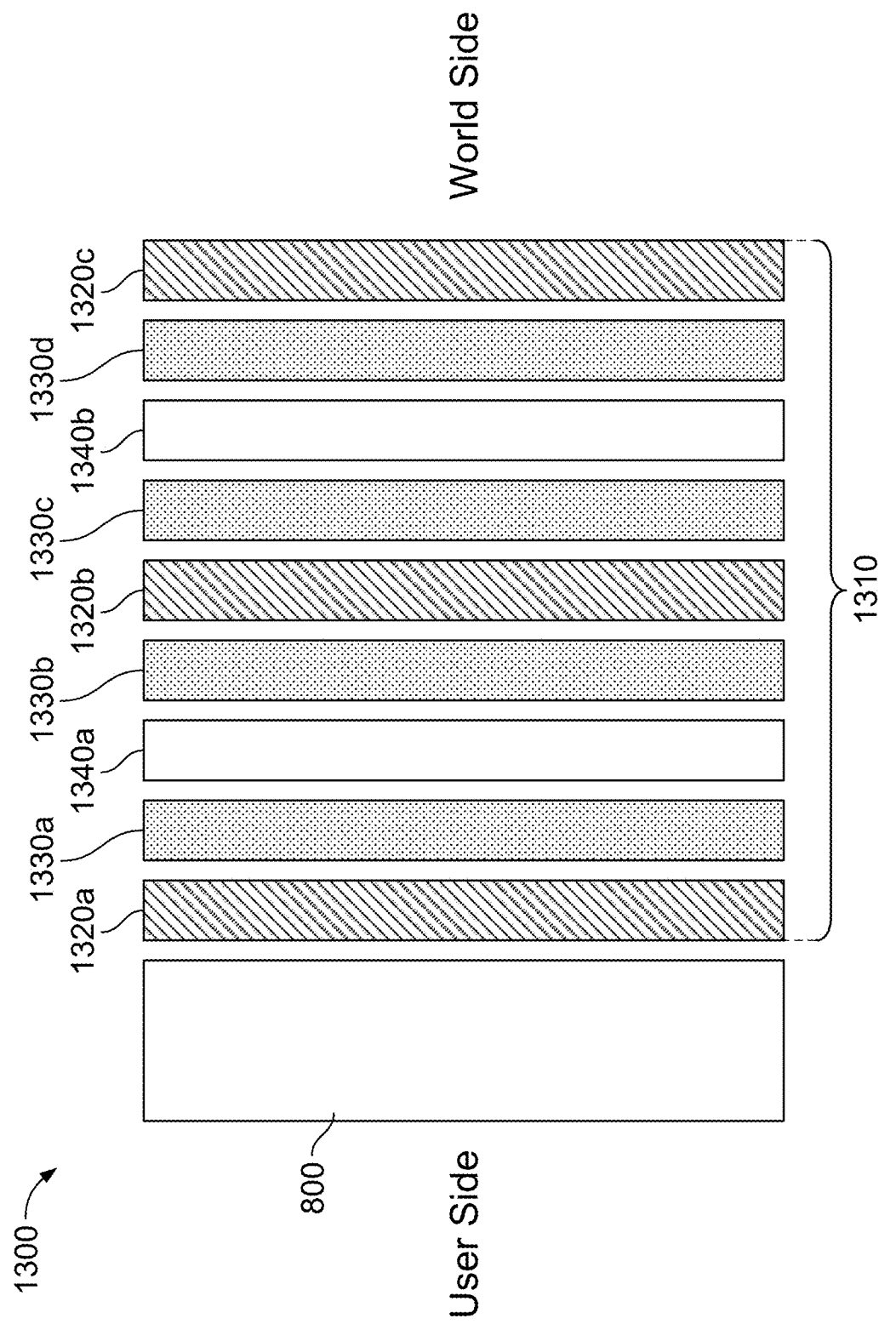
FIG. 13 is an example of an eyepiece with a multiple O-plates.

While FIG. 11A shows an example of an optical attenuator that includes a spatially varying O-plate 1140 between two linear polarizers 1120, implementations with additional layers are possible. For example, FIG. 13 shows an eyepiece 1300 that includes a film stack 1310 applied to the world side of display combiner 800. Film stack 1310 includes three linear polarizers 1320a, 1320b, and 1320c. A first polarization adjustment stack is arranged between polarizers 1320a and 1320b. This stack includes a pair of QWs 1330a and 130b on either side of a spatially varying O-plate 1340a. A second polarization adjustment stack is arranged between polarizers 1320b and 1320c. This stack includes QWs 1330c and 1330d on either side of a spatially varying O-plate 1340b. Effectively, stack 1310 performs like two stacks 1110 stacked together.

Stack 1110 can be considered a single stage arrangement, and stack 1310 a double stage. Generally, additional stages can be added.

Figure 14B:
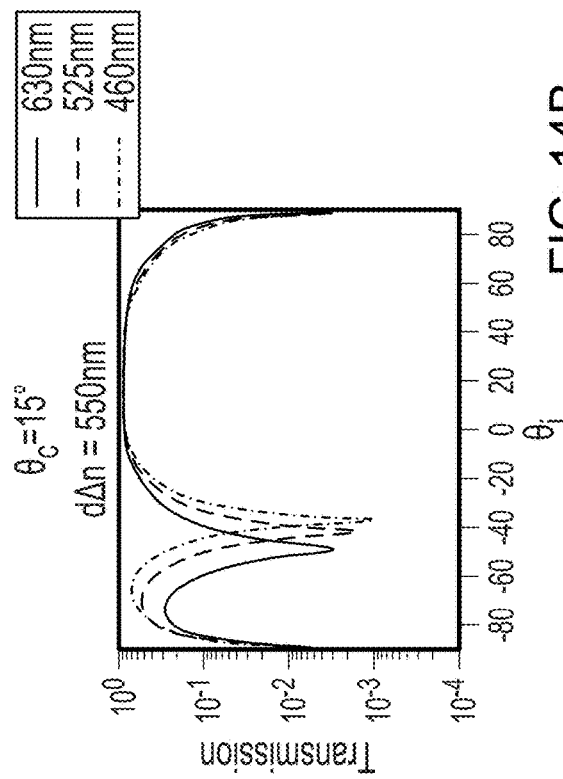
FIGS. 14A-14D are plots of calculated transmission profiles of example O-plates for three wavelengths.

Turning now to the performance of single and double stage optical attenuators, in general, the transmission profiles achieved with a double stage film stack 1310 can achieve more significant attenuation of artifacts generated from high angle of incidence ambient light. FIGS. 14A-14D are plots of calculated transmission profiles for three different wavelengths (e.g. 630 nm, 525 nm, 460 nm) of ambient light incident on a clear aperture. The plots compare the normalized logarithmic transmission of light against the incident angle $\theta_i$. FIGS. 14A and 14B show the calculated transmission profiles for a single stage film stack, such as stack 1110, in which the birefringent film has a retardation (d$\Delta$n) of 550 nm. FIG. 14A is calculated using a single stage film stack with an azimuthal orientation $\theta_c$ of 0° (i.e., a C-plate) and shows bilateral symmetry about the peak transmission at an incident angle $\theta_i$ of 0°. The three calculated transmission profiles for light with respective wavelengths of 630 nm (red), 525 nm (green), and 460 nm (blue) decrease monotonically until an incident angle $\theta_i$ of ~±60° with the 460 nm transmission profile decreasing at the highest relative rate. Depending on the wavelength, the transmission profiles then exhibit a reversal (e.g., 525 nm, 460 nm) or a shoulder (630 nm) between the incident angle $\theta_i$ ranges of ±60° to ±80° before decreasing exponentially to an incident angle $\theta_i$ of ±90°.

In contrast, FIG. 14B shows the calculated transmission profiles for a single stage film stack 1110 with an azimuthal orientation $\theta_c$ of 15°. The three calculated transmission profiles for light with respective wavelengths of 630 nm (red), 525 nm (green), and 460 nm (blue) are no longer symmetric and peak transmission has shifted to a window of ±20° centered around an incident angle $\theta_i$ ~20°. For incident angles $\theta_i$ greater than −20° the transmission profiles exponentially fall to zero by an incident angle $\theta_i$ of 90°. However, with decreasing incident angles $\theta_i$ the transmission profiles fall depending on their wavelength (e.g., 460 nm decreases at the highest relative rate) until an incident angle $\theta_i$ window between ~−40° and −50°. At incident angles $\theta_i$ between ~−40° and −70°, the transmission profiles increase to a secondary peak by a logarithmic factor between ~$10^2$ (630 nm) and $10^3$ (460 nm). This secondary peak approaches the value of the primary peak as calculated for the 460 nm wavelength transmission profile. After ~−70°, the transmission profiles fall to zero by an incident angle $\theta_i$ of −90°.

These ranges of incident angle $\theta_i$ in which the transmission profiles in FIGS. 14A and 14B increase, ~±60° to ±80° and ~−40° to −70° respectively, may lead to unwanted color shift in the field of view of the user with significant variation between wavelength transmission profiles. For example, at an incident angle $\theta_i$ of ~−40° in FIG. 14B, the transmission profile of light at 460 nm (blue) shows a >100-fold reduction in transmission compared to light at 630 nm. This can appear to the user as a significant red hue shift, another undesirable optical artifact. In order to achieve strong attenuation of light over all angles outside of the range required for world transmission, it may be beneficial to use a double stage film stack.

Figure 14D:
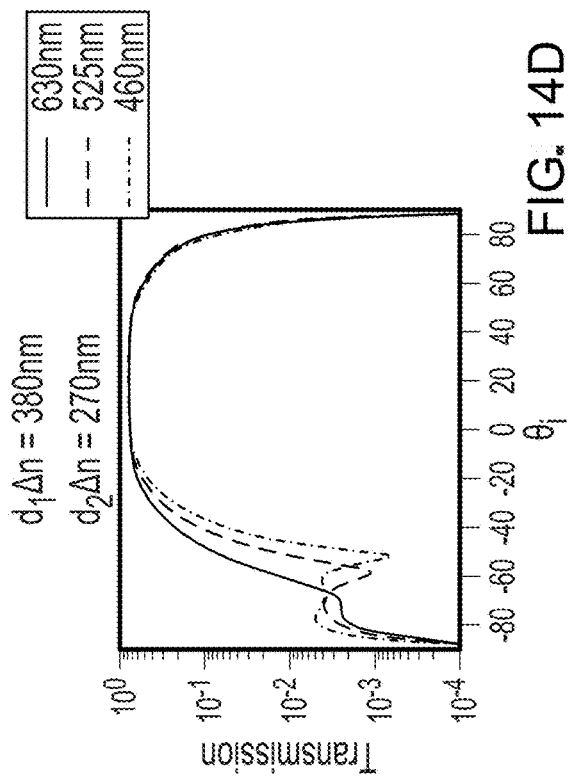
Figure 14A:
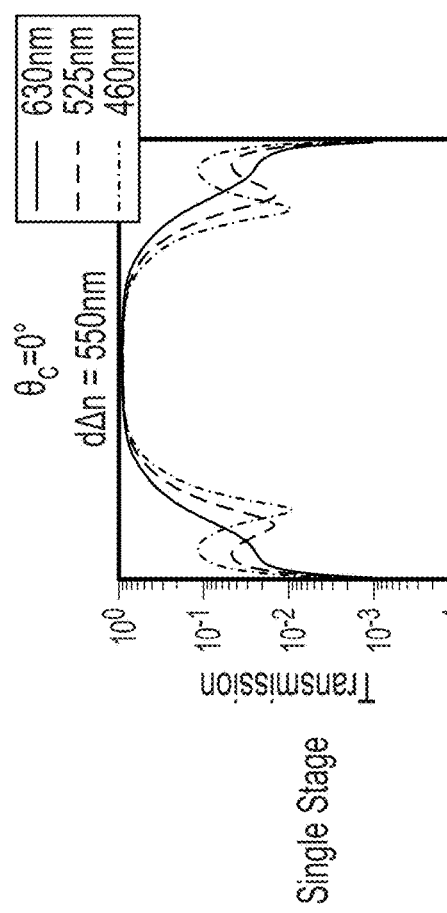
Figure 14C:
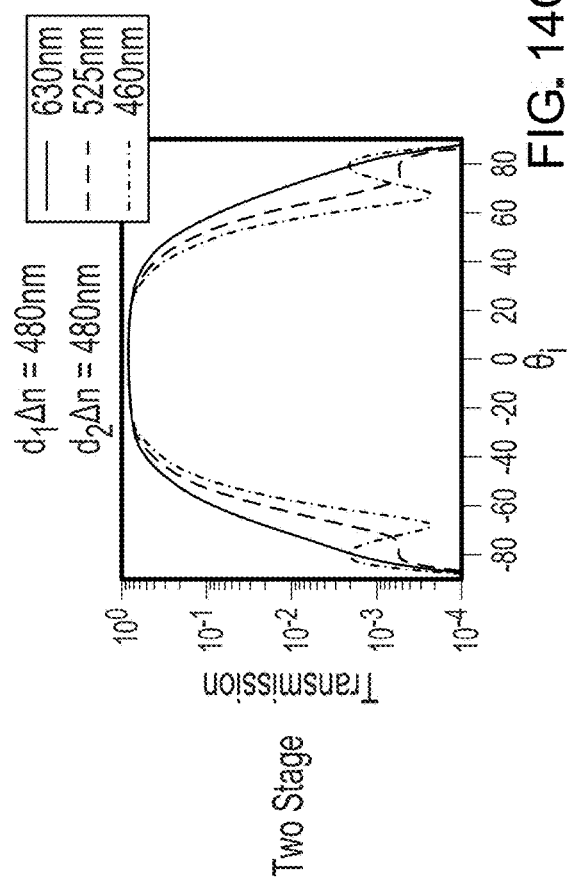

FIGS. 14C and 14D show the calculated transmission profiles for an eyepiece using a double stage film stack, such as 1310. FIG. 14C is calculated using a double stage film stack in which both stages have a retardation (d$_1$$\Delta$n, d$_2$$\Delta$n) of 480 nm with a director axis azimuthal orientation $\theta_c$ of 0° and shows bilateral symmetry about the peak transmission at an incident angle $\theta_i$ of 0°, much like the single stage film stack 1110 of FIG. 14A. However, at bilateral incident angles $\theta_i$ range of ±60° to ±80°, the secondary peaks shown in FIG. 14A are no longer as apparent, being reduced by additional logarithmic factors of between ~10 (630 nm) and $10^2$ (460 nm). Additionally, the peak transmission window remains the same in an incident angle $\theta_i$ range of ~±20° between a single stage film stack 1110 and a double stage film stack 1310.

FIG. 14D is calculated using a double stage film stack with birefringent films with retardations of $d_1 \Delta n$ 380 nm and $d_2 \Delta n$ of 270 nm and a director axis azimuthal orientation $\theta_c$ of 15°. The peak transmission window remains the same at an incident angle $\theta_i$ range of ~±20° centered on an incident angle $\theta_i$ of 20° as in FIG. 14B. Though as in FIG. 15C, the secondary peak seen at incident angles $\theta_i$ between ~−40° and −70° is significantly attenuated by logarithmic factors of greater than $10^2$.

The calculated transmission profiles of FIGS. 14C and 14D demonstrate that the use of a double stage film stack over a single stage film stack can advantageously attenuate secondary peaks generated outside the desired angular world transmission range, particularly when the director axis is skewed. Additionally, the wide variation in color shift at high angles of incidence, leading to birefringent rainbow artifacts, is significantly attenuated as well. FIGS. 14A and 14C may be preferential embodiments of director axis orientation for use in centrally located spatially varying O-plate regions such as 1220i where the viewing angle through the clear aperture is reduced to ~±20° which corresponds to the particular world transmission window of FIGS. 14A and 14C. FIGS. 14C and 14D may be embodiments of director axis orientation in spatially varying O-plate regions such as 1220a-1220h as the world transmission window in those regions would be at incident angles $\theta_i$ greater than 0° and possibly less than 50°.

FIGS. 15A through 15C are examples of the transmission profiles that can be achieved through the O-plates with azimuthally and radially oriented director axes. The graphs are normalized heat map representations of calculated total transmission through a clear aperture using an O-plate across an arbitrary y-axis range and an equal arbitrary x-axis range. Each graph has been calculated using a different combination of azimuthal and radial orientation (e.g. $\theta_c$, $\phi_c$) of the director axis of the O-plate. To the left of FIG. 15C is a reference coordinate system including the orientation of angles $\theta$, and $\phi$. In FIG. 15A, the azimuthal orientation $\theta_c$ is normal to the O-plate and radial orientation $\phi_c$ is 0. The calculated transmission profile displays a radially symmetric pattern of transmission with a peak 1410 at wavenumbers ky=kx=0 where transmission is maximum. The transmission decreases as a function of radial distance until reaching 0 at a radial distance of 1.

FIG. 15B shows the calculated transmission profile of an O-plate whose director axis has an azimuthal orientation $\theta_c$ of 15° and radial orientation $\theta_c$ of 45° anticlockwise of the x-axis. The calculated transmission profile is no longer radially symmetric but bilaterally symmetric around a line that bisects the calculated transmission profile from (−1,−1) to (1, 1) in the (x, y) plane. The peak of the calculated transmission profile 1411 is around (−0.3, 0.3), allowing the preferred transmission of light in the first quadrant of the graph.

FIG. 15C shows the calculated transmission profile of an O-plate whose director axis has an azimuthal orientation $\theta_c$ of 15° and radial orientation $\phi_c$ of −45° clockwise of the x-axis. The calculated transmission profile is bilaterally symmetric around a line that bisects the calculated transmission profile from (−1, 1) to (1,−1) in the (x, y) plane. The peak of the calculated transmission profile 1412 is around (−0.3, −0.3), allowing the preferred transmission of light in the fourth quadrant of the graph.

In general, while the foregoing examples show calculations for specific O-plate arrangements, they are merely illustrative. More generally, the retardation of the film, number and shape of domains, director alignment within each domain can be selected according to the eyebox size and grating structure to provide desired attenuation of unwanted diffracted ambient light.

FIGS. 16A-T further illustrate the amount of attenuation that is possible using single, double, and spatially varying double stage O-plate optical attenuators. These images illustrate an undesirable optical artifact (e.g. optical rainbow) when an ambient light source is incident upon an eyepiece at a high angle of incidence. As white ambient light from nearby sources interacts with the grating 710 structures in the display combiner 700 from a high angle of incidence, the light becomes diffracted, as shown in FIG. 7B. The amount of diffraction depends on the wavelength of the incident light and grating 710 pitch or spacing. White light is made up of many wavelengths and each wavelength of the incident ambient light diffracted toward the user is diffracted to a different angle. This causes the white light to appear spread out into a rainbow as seen by the user, causing an undesirable optical artifact (e.g. optical rainbow).

In FIGS. 16A-16T the optical rainbow artifact is shown for a white-light source with a 5700K blackbody spectra incident on the eyepiece from above at 70° (FIGS. 16A-16D), 60° (FIGS. 16E-16H), and 50° (FIGS. 16I-16L), 40° (FIGS. 16M-16P), and 30° (FIGS. 16Q-16T) angles of incidence. A grating 710 pitch of 391 nm was used to calculate the diffraction angles of the artifact. The black circle in each image corresponds to a viewing angle of ±42° as seen from a user with an eyebox of 4 mm, an eye relief of 20 mm, and a clear aperture height of 36.3 mm, as shown to the right of FIGS. 16A-T. The first column of images 1610 shows the calculated optical rainbow artifact as seen to the user if no filter were present. The second column of images 1611 shows the calculated optical rainbow artifact as seen to the user if a single stage film stack 1110 were used. The third column of images 1612 shows the calculated optical rainbow artifact as seen to the user if a double stage film stack 1310 were used. The director axis of the O-plate used to calculate the second column 1611 and third column 1612 has no azimuthal or radial orientation (e.g. $\theta_c=\phi_c=0°$). The fourth column of images 1613 shows the calculated optical rainbow artifact as seen to the user if a double stage spatially varying O-plate film stack were used. The double stage spatially varying O-plate used to calculate the fourth column 1613 is of the design shown in FIG. 12B.

Using the images in column 1610 as references, the largest and brightest optical rainbow artifact are seen at the larger angles of incidence (e.g. 60°, 70°). At the larger angles of incidence (e.g. 60°, 70°), single- 1611 (FIGS. 16B and 16F) and double-stage 1612 (FIGS. 16C and 16G) have a significant effect on attenuation of these optical rainbow artifacts and the use of a double stage spatially varying O-plate 1613 (FIGS. 16D and 16H) has a larger effect on attenuation than either single- 1611 or double-stage 1612 film stacks. This remains true for all other images and incident angles in the remaining images shown in FIG. 16. Single- 1611 and double-stage 1612 film stacks have a significant effect on attenuation of the apparent optical rainbow artifact while double stage 1613 film stacks using a spatially varying O-plate have the largest effect.

Optical attenuators using spatially-varying O-plates can be further beneficial in reducing spatial color variations that can result from the use of an optical attenuator. FIGS. 17A-17D shows the color shift as perceived by a user when a white light is seen through a viewing angle of ±45° using no filter (FIG. 17A), a single stage film stack (FIG. 17B), a double stage film stack (FIG. 17C), and double stage film stack using a spatially varying O-plate (FIG. 17D). The blue circles in the field of view represent 15° degree increments. The film stacks used to calculate the white shifts in FIGS. 17A-17D are the same film stacks used to calculate the first through fourth columns (1610, 1611, 1612, 1613) in FIG. 16 (e.g., no filter, no director axis orientation, spatially varying O-plate of the design shown in FIG. 12B). In certain embodiments, the white point shift can be 0.01 $\Delta u'v'$ or less (e.g., 0.005 or less, 0.002 or less, 0.001 or less, 0.0005 or less) from the D65 white point over angles of incident of ±40°, in at least one direction (e.g., over the entire range of incident angles of 40° or less).

While the use of single-, and double-stage, film stacks may provide significant attenuation of apparent optical rainbow artifacts as shown in FIG. 16, columns 1611 and 1612, they also create a perceptible color shift within a 45° viewing angle. In FIG. 17B, between the viewing angles of ±30° and ±45° (e.g., between the second blue ring and the edge of the field of view) there is a perceptible shift to red frequencies. This same effect can be seen in FIG. 14A. At the incident angle $\theta_i$ of ±45°, the 630 nm transmission profile is higher than the 480 nm transmission profile. Longer wavelengths relate to more red colors and since the transmission at those wavelengths is higher, the perceived color shifts to a red hue.

The same effect is seen in FIG. 17C but to a larger degree. In FIG. 14C at the incident angle $\theta_i$ of ±45°, the 630 nm transmission profile is higher still than the 480 nm transmission profile and both transmission profiles are at lower values at ±45° than in FIG. 14A. This is a combined effect of loss of total transmission at ±45° viewing angle and a further reduced 480 nm transmission profile compared to 630 nm when using a double stage film stack 1310.

FIG. 17D represents the same color shift as perceived by a user through a double stage film stack using a spatially varying O-plate. In addition to a lower red shift at extreme viewing angles near ±45°, the overall transmission is higher across the entire viewing window. This can attributed to the three spatially varying regions in FIG. 12B. The director axis of the upper region 1221a has an azimuthal orientation $\theta_c$ of 15° and a radial orientation $\phi_c$ of 90° (positive vertical), the director axis of the middle region 1221b has a azimuthal and radial orientation normal to the face of the O-plate, and the lower region 1221c has an azimuthal orientation $\theta_c$ of 15° and a radial orientation $\phi_c$ of −90° (negative vertical). These director axis orientations allow the peak world transmission windows of each region 1221a-c to overlap with the ambient light incident angles of the viewing window. The combination of the world transmission windows from FIG. 14C (±20°), 14D (20°±20°), and 14D with the opposite radial orientation $\phi_c$ (−20°±20°) allow for a total near-peak world transmission window of ∼±40° as seen in FIG. 17D.

In general, a variety of suitable different materials can be used for each of the layers in an optical attenuator. Linear polarizers, for example, can be formed from stretched polymer material (e.g., PVA) that has been stained with a chromophore (e.g., iodine). Commercially available linear polarizers, such as those available from Sanritz Co. (Japan) or Nitto Denko (Japan), can be used. QWs can be made from stretched polymer films or liquid crystal polymer films, for example. O-plates can be liquid crystal materials including polymer liquid crystal materials.

In general, the film stacks can include additional layers beyond those described above. For instance, stacks can include additional layers to provide mechanical functions, rather than optical functions. Adhesive layers and/or layers for mechanical strength and/or environmental protection can be included. Such layers can be optically isotropic, so as to not significantly impact polarization of transmitted light. In some embodiments, the stack includes one or more layers on the world side of the outermost linear polarizer.

For instance, antireflection films and/or hardcoat layers can be included. While the foregoing examples of optical attenuators include optically passive elements, more generally, implementations can feature optically active elements too. Such elements can change their optical properties, and thus change the transmissive properties of the optical attenuator, in response to an electrical signal or some other physical stimulus. For example, the O-plate domains can be electro-optically adjustable. For instance, the O-plate can be formed as a liquid crystal cell to which an electric field can be applied in order to vary the LC director orientation between two or more different states, thereby changing the transmission properties of each domain.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 18:
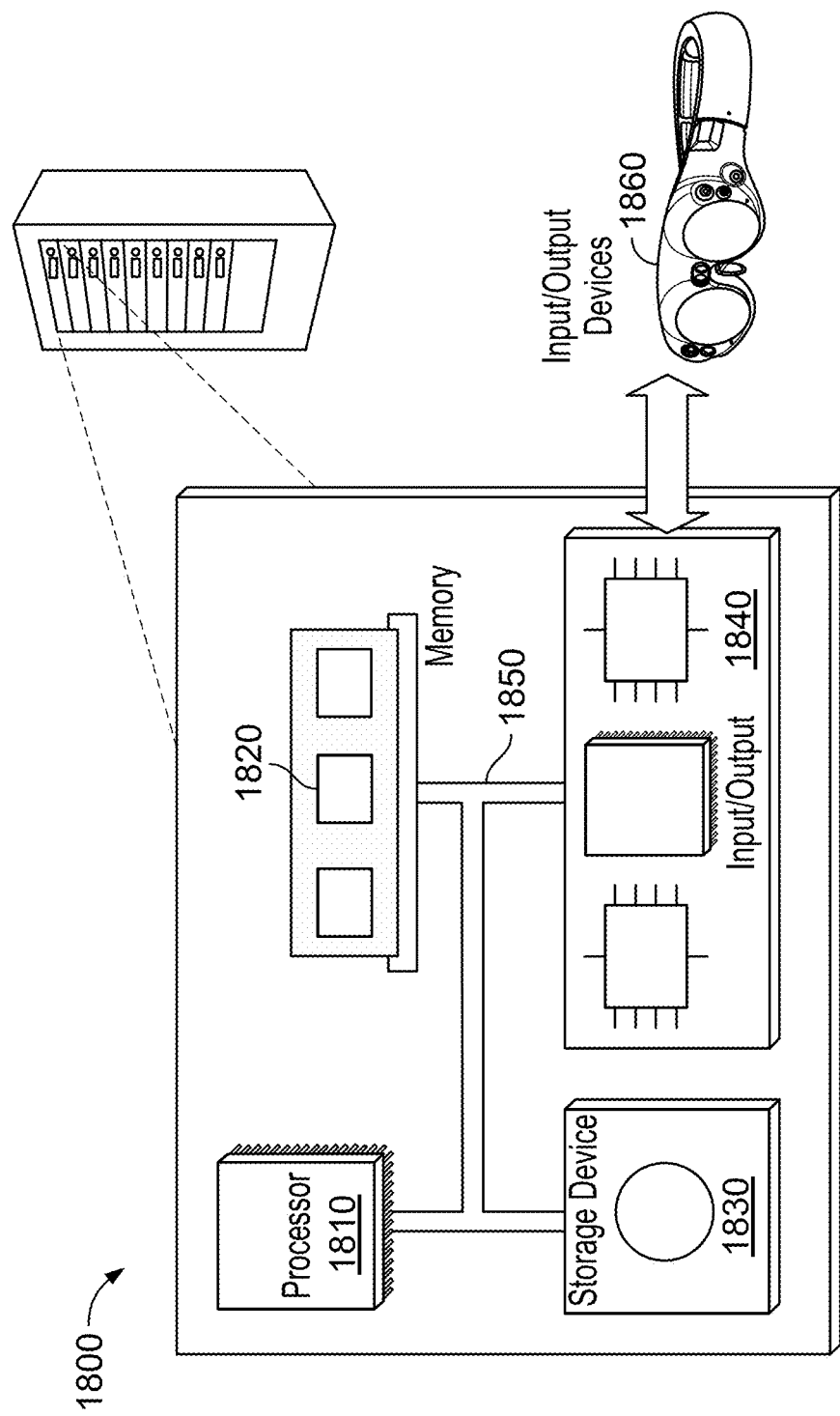
FIG. 18 is a diagram of an example computer system useful with a wearable display system.

FIG. 18 shows an example computer system 1800 that includes a processor 1810, a memory 1820, a storage device 1830 and an input/output device 1840. Each of the components 1810, 1820, 1830 and 1840 can be interconnected, for example, by a system bus 1850. The processor 1810 is capable of processing instructions for execution within the system 1800. In some implementations, the processor 1810 is a single-threaded processor, a multi-threaded processor, or another type of processor. The processor 1810 is capable of processing instructions stored in the memory 1820 or on the storage device 1830. The memory 1820 and the storage device 1830 can store information within the system 1800.

The input/output device 1840 provides input/output operations for the system 1800. In some implementations, the input/output device 1840 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., wearable display system 1860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A method, comprising:
    displaying images to a user via an eyepiece stack of a wearable display system to augment the user's field of view of the user's environment;
    attenuating transmission of ambient light from the user's environment through the eyepiece stack to the user while displaying the images, the attenuating comprising:
        polarizing the ambient light incident on the eyepiece stack to provide polarized ambient light;
        using a spatially-varying o-plate having a plurality of domains each having a principal optic axis oriented in a corresponding direction different from the direction of other domains, rotating a polarization state of the polarized ambient light by an amount related to the incident angle of the polarized ambient light and the domain at which the polarized ambient light is incident, the rotating providing polarization-rotated ambient light; and
        absorbing at least a portion of the polarization-rotated ambient light to provide attenuated ambient light, an amount of absorption varying depending on an incident angle of the polarization-rotated polarized ambient light and the domain at which the corresponding polarized ambient light is incident; and combining the attenuated ambient light with light forming the displayed images to provide the augmented field of view of the user's environment.

2. The method of claim 1, wherein, at a domain intersecting a viewing axis of the wearable display, the polarization state of the polarized ambient light is rotated by zero degrees, and, at least one domain away from the viewing axis, the polarization state of the polarized ambient light is rotated by an amount greater than zero.

3. The method of claim 2, wherein rotating the polarization state of the polarized ambient light comprises rotating the polarization state by an amount in a polar coordinate direction and rotating the polarization state by an amount in an azimuthal direction.

4. The method of claim 3, wherein, for at least two domains in which the polarization state of the polarized ambient light is rotated by a nonzero amount, the amount the polarization state is rotated in the polar coordinate direction is different than the amount the polarization state is rotated in the azimuthal direction.

5. The method of claim 1, wherein the plurality of domains comprises domains arranged in a one dimensional pattern, or a two dimensional pattern.

6. The method of claim 1, wherein polarizing the ambient light comprises linearly polarizing the ambient light along a first pass axis.

7. The method of claim 6, wherein absorbing at least the portion of the polarization-rotated ambient light comprises using a linear polarizer having a pass axis that is crossed from the first pass axis.

8. The method of claim 6, wherein polarizing the ambient light further comprises circularly polarizing the ambient light and, prior to absorbing, circularly polarizing the polarization-rotated ambient light.

9. The method of claim 8, wherein the amount by which the polarization state of the ambient light is rotated varies depending on an angle of incidence of light incident on the eyepiece stack.

10. The method of claim 9, wherein light having large angles of incidence is rotated less than light having small angles of incidence.

11. The method of claim 1, further comprising, using a second layer of a birefringent material having a second plurality of domains each having a principal optic axis oriented in a corresponding direction different from the direction of other domains, rotating a polarization state of the polarization-rotated ambient light by an amount related to the incident angle of the polarization-rotated ambient light and the domain at which the polarization-rotated ambient light is incident, the rotating providing twice-polarization-rotated ambient light, and absorbing at least a portion of the twice-polarization-rotated ambient light to provide the attenuated ambient light.

12. The method of claim 11, further comprising, between the first rotating and the second rotating, linearly polarizing the polarization-rotated ambient light.

13. The method of claim 1, wherein for an aperture of the eyepiece stack corresponding to an eyebox of the wearable display, a white point of images viewed through the eyepiece stack on a user side with a D65 illuminant on a world side varies by 0.01 Δu'v' or less in a CIELUV color space for incident angles of 40° or less across an aperture of the eyepiece stack defining the eyebox.

14. The method of claim 13, wherein the aperture has a diameter in a range from 20 mm to 50 mm.

* * * * *